US009761224B2

(12) United States Patent
Morimoto et al.

(10) Patent No.: US 9,761,224 B2
(45) Date of Patent: Sep. 12, 2017

(54) DEVICE AND METHOD THAT POSTS EVALUATION INFORMATION ABOUT A FACILITY AT WHICH A MOVING OBJECT HAS STOPPED OFF BASED ON AN UTTERED VOICE

(71) Applicant: MITSUBISHI ELECTRIC CORPORATION, Tokyo (JP)

(72) Inventors: Takuji Morimoto, Tokyo (JP); Kiyoshi Matsutani, Tokyo (JP); Shinji Akatsu, Tokyo (JP); Atsushi Matsumoto, Tokyo (JP); Yasutaka Konishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 19 days.

(21) Appl. No.: 14/765,303

(22) PCT Filed: Apr. 25, 2013

(86) PCT No.: PCT/JP2013/062260
§ 371 (c)(1),
(2) Date: Jul. 31, 2015

(87) PCT Pub. No.: WO2014/174640
PCT Pub. Date: Oct. 30, 2014

(65) Prior Publication Data
US 2016/0005396 A1 Jan. 7, 2016

(51) Int. Cl.
*G10L 15/08* (2006.01)
*G06Q 30/02* (2012.01)

(52) U.S. Cl.
CPC .......... *G10L 15/08* (2013.01); *G06Q 30/0278* (2013.01); *G06Q 30/0281* (2013.01); *G06Q 30/0282* (2013.01); *G10L 2015/088* (2013.01)

(58) Field of Classification Search
CPC .............. G10L 15/08; G10L 2015/088; G06Q 30/0281; G06Q 30/0282; G06Q 30/0278
USPC ........................................................ 704/249
See application file for complete search history.

(56) References Cited

U.S. PATENT DOCUMENTS

2005/0144011 A1* 6/2005 Kawana .................. G10L 15/22
704/277
2006/0009702 A1* 1/2006 Iwaki ....................... A61B 5/00
600/520

(Continued)

FOREIGN PATENT DOCUMENTS

JP 2005-315802 A 11/2005
JP 2006-178228 A 7/2006

(Continued)

*Primary Examiner* — Edwin S Leland, III
(74) *Attorney, Agent, or Firm* — Birch, Stewart, Kolasch & Birch, LLP

(57) ABSTRACT

An evaluation information posting device determines a rest state of a vehicle on the basis of rest information, determines a facility at which the vehicle has stopped off by using position information showing a rest position of the vehicle, map information including facility information about facilities located in an area surrounding the position shown by this position information, and a keyword about a facility at the rest position of the vehicle, and, by using both stop-off facility information about the facility which is a result of the determination, and a keyword about an evaluation which is provided for this facility, generates evaluation information about the stop-off facility and posts this evaluation information to an evaluation information managing server.

13 Claims, 23 Drawing Sheets

(56) References Cited

U.S. PATENT DOCUMENTS

| | | | |
|---|---|---|---|
| 2011/0276396 A1* | 11/2011 | Rathod | G06F 17/30867 705/14.49 |
| 2012/0330662 A1* | 12/2012 | Saikou | G10L 15/26 704/239 |
| 2014/0018101 A1* | 1/2014 | Namba | G06Q 10/08 455/456.2 |
| 2015/0120300 A1* | 4/2015 | Maruta | G06F 17/30746 704/251 |
| 2015/0149163 A1* | 5/2015 | VanBlon | G10L 15/08 704/231 |
| 2015/0213643 A1* | 7/2015 | Obinata | G01C 21/3614 345/634 |
| 2015/0262574 A1* | 9/2015 | Terao | G10L 25/63 704/246 |
| 2015/0339390 A1* | 11/2015 | Urdiales Delgado | G10L 25/54 707/711 |
| 2016/0078571 A1* | 3/2016 | Singh | G06Q 50/12 705/14.66 |

FOREIGN PATENT DOCUMENTS

| | | | |
|---|---|---|---|
| JP | 2006178228 A | * | 7/2006 |
| JP | 2007-255897 A | | 10/2007 |
| JP | 2010-164385 A | | 7/2010 |
| JP | 2010-244433 A | | 10/2010 |
| JP | 2011-221852 A | | 11/2011 |
| JP | 4826087 B2 | | 11/2011 |
| WO | WO 2011/093025 A1 | | 8/2011 |
| WO | WO 2012/098651 A1 | | 7/2012 |

* cited by examiner

FIG.2

| Keyword | Evaluation |
|---------|------------|
| Spicy | Good |
| Hot | Good |
| Tepid | Bad |
| ⋮ | ⋮ |

FIG.3

| Keyword | Evaluation |
|---------|------------|
| Sweet | Good |
| Spicy | Bad |
| Cold | Good |
| Tepid | Bad |
| ⋮ | ⋮ |

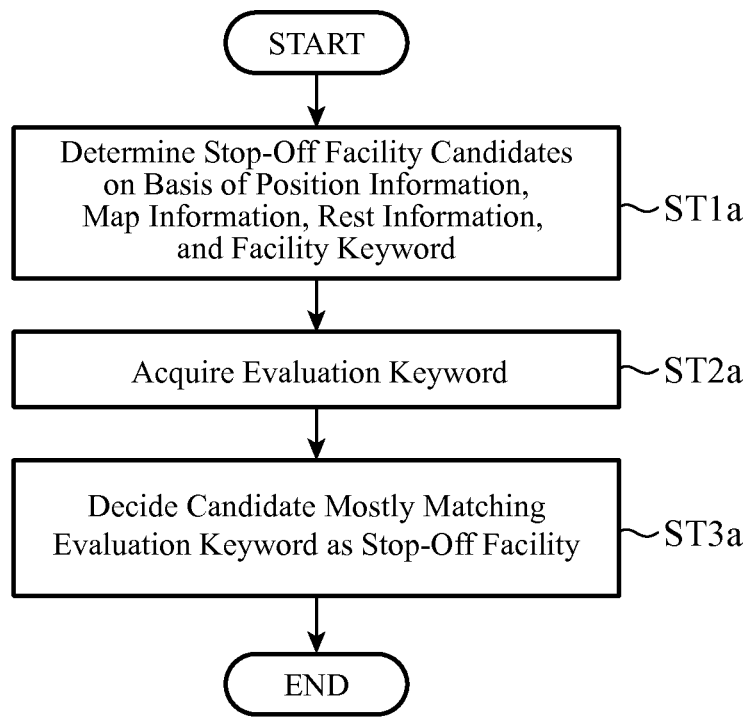

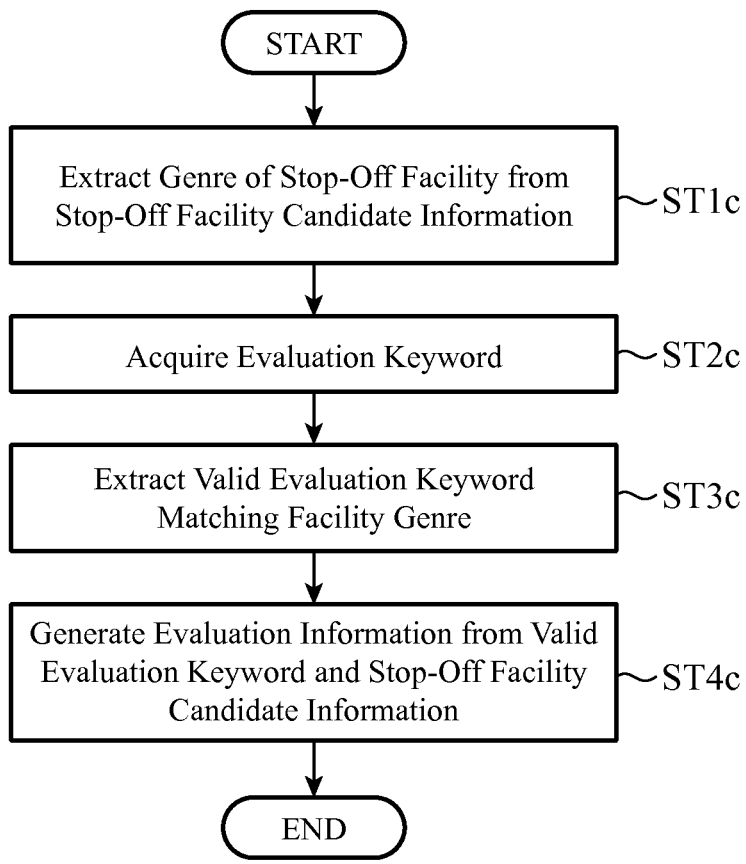

FIG.21

| Facility Genre | Keyword/Consistency |
| --- | --- |
| Ramen | Spicy/5, Hot/5, Cheap/4, Tepid/3, … |
| Hot Spring | Hot/5, Tepid/5, Crowded/3, … |
| ⋮ | ⋮ |

DEVICE AND METHOD THAT POSTS EVALUATION INFORMATION ABOUT A FACILITY AT WHICH A MOVING OBJECT HAS STOPPED OFF BASED ON AN UTTERED VOICE

FIELD OF THE INVENTION

The present invention relates to an evaluation information posting device and an evaluation information posting method that generate evaluation information about a facility, such as a shop, and post the evaluation information to a site for managing evaluation information.

BACKGROUND OF THE INVENTION

In recent years, a Web service that enables the user to post evaluation information (word-of-mouth information) about a facility, such as a shop, and enables other users to browse evaluation information to use this evaluation information for selection of a shop, and so on (described as a user post type of service from here on) has become popular. It can be said that a user post (review) function is indispensable particularly for online shopping sites and restaurant search sites, and many users refer to reviews when doing their shopping and making a destination search. This flow cannot be disregarded in the motor vehicle industry, and cooperation with a user post type of service has been studied in many telematics services.

By the way, in order to ensure the reliability of the description of an evaluation in a user post type of service, there is a necessity that many users post evaluation information. However, the generation and posting of evaluation information are a time-consuming process for users, and many posts are not gathered when users think that the posting is a troublesome work. Therefore, a measure to reduce the user load of posting evaluation information is taken.

As a conventional technique of urging a user to post evaluation information by using vehicle-mounted equipment, for example, there is an invention disclosed by patent reference 1. In accordance with this patent reference 1, when a car makes a transition from an idle state to an active state, a display for urging a user to perform an operation of performing an evaluation about a facility is presented.

Further, in patent reference 2, a system that determines that a user has stopped off at a facility set as a destination from a parking position and a time, and generates and stores stop-off facility information is described.

In addition, in accordance with patent reference 3, a voice recognition is performed on a talk in a vehicle cabin, a point keyword which is uttered and a feeling keyword are linked with each other, and evaluation information about a facility is automatically generated.

RELATED ART DOCUMENT

Patent Reference

Patent Reference 1: Japanese Unexamined Patent Application Publication No. 2006-178228
Patent reference 2: Japanese Unexamined Patent Application Publication No. 2010-164385
Patent reference 3: Japanese Unexamined Patent Application Publication No. 2007-255897

SUMMARY OF THE INVENTION

Problems to be Solved by the Invention

In accordance with patent reference 1, although a user can be urged to post evaluation information when triggered by the car's transition from an idle state to an active state, the load on the user of generating and posting evaluation information cannot be reduced. Therefore, evaluation information will not be posted when the user thinks that the posting is a troublesome work, like in the case of using conventional techniques.

Further, in accordance with patent reference 2, whether the user has stopped off at a facility set as a destination is determined from a parking position and a time. However, when a plurality of shops exist in the areas surrounding the parking position, it is difficult to generate precise evaluation information because at which facility the user has stopped off cannot be determined.

In addition, in accordance with patent reference 3, by performing a voice recognition on a talk in a vehicle cabin, a point keyword and a feeling keyword are linked with each other and evaluation information about a facility is generated automatically. In accordance with this invention, a point keyword is the official name, an abbreviation, and a common name of a facility, and a stop-off facility cannot be specified without an utterance of such a keyword showing a facility.

For example, when a user utters "That ramen shop is spicy and delicious", because "that ramen shop" does not show the name, an abbreviation, or the like of the facility (ramen shop), the stop-off facility cannot be specified from this uttered content.

More specifically, in accordance with the invention described in patent reference 3, because a stop-off facility is not determined from a keyword which is acquired by performing a voice recognition, no facility can be specified and no evaluation information can be generated unless the user utters an official name, an abbreviation, or a common name showing a facility.

The present invention is made in order to solve the above-mentioned problems, and it is therefore an object of the present invention to provide an evaluation information posting device and an evaluation information posting method that can reduce the load on the user of generating evaluation information about a stop-off facility, and posting the evaluation information to an evaluation information managing server.

Means for Solving the Problem

In accordance with the present invention, there is provided an evaluation information posting device that is mounted or carried by a moving object, and that generates evaluation information about a facility at which the moving object has stopped off, and posts the evaluation information to an evaluation information managing server, the evaluation information posting device including: a position information acquirer to acquire position information about the moving object; a voice acquirer to acquire an uttered voice; a facility keyword extractor to extract a keyword about a facility from the uttered voice acquired by the voice acquirer; an evaluation keyword extractor to extract a keyword about an evaluation from the uttered voice acquired by the voice acquirer; a rest information acquirer to acquire rest information showing that the moving object has been at rest; a stop-off facility determinator to determine a rest state of the moving object on the basis of the rest information acquired by the rest information acquirer, and determine a facility at which the moving object has stopped off by using position information about the rest position of the moving object, which is acquired by the position information acquirer, map information including facility information about facilities located in an area surrounding the position shown by this position information, and a keyword about a facility at the rest position of the moving object, which is extracted by the facility keyword extractor; an evaluation information generator to, by using both facility information about the facility determined by the stop-off facility determinator, and a keyword about an evaluation which is extracted for this facility by the evaluation keyword extractor, generate evaluation information about this facility; and a posting processor to post the evaluation information generated by the evaluation information generator to the evaluation information managing server.

Advantages Of The Invention

In accordance with the present invention, there is provided an advantage of being able to reduce the load on the user of generating evaluation information about a stop-off facility and posting the evaluation information to the evaluation information managing server.

BRIEF DESCRIPTION OF THE FIGURES

FIG. 2 is a diagram showing an association table of an association between each evaluation keyword about a facility genre of "one-pot dish restaurant", and the description of an evaluations corresponding to this evaluation keyword;

FIG. 3 is a diagram showing an association table of an association between each evaluation keyword about a facility genre of "ice cream store", and the description of an evaluation corresponding to this evaluation keyword;

FIG. 6 is a flow chart showing an example of a stop-off facility determining process in Embodiment 2;

FIG. 7 is a diagram showing an association table of an association between evaluation keywords and a facility genre corresponding to these evaluation keywords;

FIG. 11 is a flow chart showing an example of an evaluation information generating process in Embodiment 4;

FIG. 12 is a diagram showing an association table of an association between each facility genre and evaluation keywords corresponding to this facility genre;

FIG. 21 is a diagram showing an association table of an association between each facility genre, and evaluation keywords and scores showing the degrees of consistency of evaluation keywords in Embodiment 9;

EMBODIMENTS OF THE INVENTION

Hereafter, in order to explain this invention in greater detail, the preferred embodiments of the present invention will be described with reference to the accompanying drawings.

Embodiment 1

Figure 1:
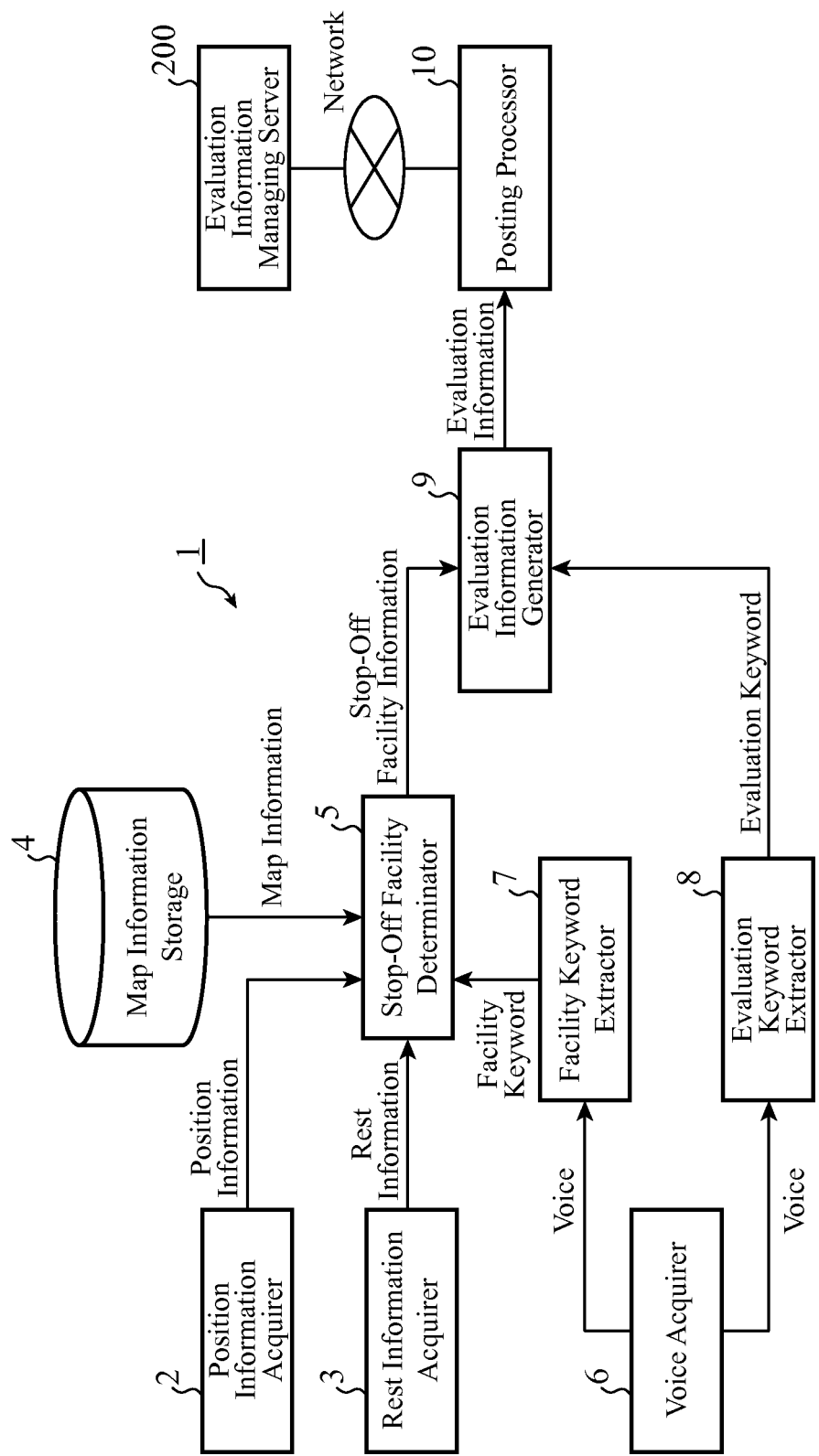
FIG. 1 is a block diagram showing the configuration of an evaluation information posting device in accordance with Embodiment 1 of the present invention.

FIG. 1 is a block diagram showing the configuration of an evaluation information posting device in accordance with Embodiment 1 of the present invention. The evaluation information posting device 1 is a vehicle-mounted device mounted in a moving object (for example, a vehicle). As shown in FIG. 1, the evaluation information posting device is configured to include a position information acquirer 2, a rest information acquirer 3, a map information storage 4, a stop-off facility determinator 5, a voice acquirer 6, a facility keyword extractor 7, an evaluation keyword extractor 8, an evaluation information generator 9, and a posting processor 10.

Although the case in which the evaluation information posting device 1 is applied to a vehicle-mounted device is shown, the evaluation information posting device 1 can be alternatively applied to a mobile terminal such as a smart phone.

The position information acquirer 2 is a functional block that acquires current position information about the vehicle. For example, the position information acquirer can be implemented by a hardware device, such as a GPS (Global Positioning System) device or a gyro, and software that calculates the latitude and longitude of the vehicle on the basis of device information acquired by one of these devices.

In the case in which the evaluation information posting device 1 is implemented as one function of either a navigation device which is carried into a vehicle, or a vehicle-mounted navigation device, the position information acquirer 2 is implemented by software using the position information about the vehicle which is acquired by the navigation device, and so on.

The rest information acquirer 3 is a functional block that acquires rest information showing that the vehicle has been at rest (has been parked). For example, the rest information acquirer is implemented by a parking signal acquisition device that acquires a parking signal from the vehicle. Further, the rest information acquirer can determine whether the vehicle has been at rest by receiving the position information about the vehicle successively from the position information acquirer 2, and determining whether or not the vehicle is at rest on the basis of temporal transitions of the position of the vehicle. In this case, the rest information acquirer 3 is implemented by software that detects a transition of the vehicle position in cooperation with the position information acquirer 2, and so on.

The map information storage 4 is a storage that stores map information including at least facility information and road information. Further, the map information storage 4 is a storage from which information can be read by the stop-off facility storage 4 as needed, and is configured in either a storage, such as a hard disk drive unit (HDD) mounted in the vehicle-mounted device, or a storage disposed in an external device, such as a server or a smart phone, connected to a network.

The stop-off facility determinator 5 determines a facility at which the vehicle has stopped off by using the position information about the vehicle which is acquired by the position information acquirer 2, map information including facility information about facilities located in an area surrounding the position shown by this position information, the rest information acquired by the rest information acquirer 3, and a keyword about a facility which is extracted by the facility keyword extractor 7.

At that time, before determining a stop-off facility, the stop-off facility determinator determines whether the vehicle has stopped off at a facility, for example. First, the stop-off facility determinator 5 successively stores a time when rest information showing that the vehicle has been at rest is acquired, and the vehicle position at that time in a nonvolatile memory.

After that, when the vehicle starts within a predetermined lower limit time period after the vehicle has been at rest, and from an area at a predetermined tolerable distance or less from the rest position, the stop-off facility determinator determines that the vehicle has been at rest for the reason of waiting for a traffic signal, or the like, and discards the rest time and the rest position which are stored in the memory.

In contrast, when the vehicle starts within a predetermined intermediate time period (can include the time when the electric power is turned off) after the vehicle has been at rest, and from an area at the predetermined tolerable distance or less from the rest position, the stop-off facility determinator determines that the vehicle has been parked since it has stopped off at a facility.

When a time has elapsed after the vehicle has been at rest and reaches an upper limit time period longer than the intermediate time period, the stop-off facility determinator determines that the vehicle has been parked at home, and discards the rest time and the rest position which are stored in the memory.

As a method of determining a stop-off facility, for example, the following methods (1) to (5) are provided.

(1) In the Case of Using a Keyword Including a Facility Name or a Facility Genre The stop-off facility determinator 5 determines stop-off facility candidates on the basis of the rest position and map information including information about facilities located in an area surrounding this position, and, when a facility name or a facility genre is included in a keyword (described as a facility keyword from here on) about a facility which the facility keyword extractor 7 extracts from an uttered voice, determines that the higher matching degree with this facility keyword of a stop-off facility candidate, among the stop-off facility candidates, the higher possibility that the vehicle has stopped off at the stop-off facility candidate.

(2) In the Case of Using a Keyword Including a Demonstrative Pronoun Showing a Location The stop-off facility determinator 5 determines stop-off facility candidates on the basis of the rest position and map information including information about facilities located in an area surrounding this position, and, when a demonstrative pronoun ("here", "there", or the like) showing a location is included as a facility keyword which the facility keyword extractor 7 extracts from an uttered voice, determines that the higher matching degree with this facility keyword of a stop-off facility candidate, among the stop-off facility candidates, the higher probability that the vehicle has stopped off at the stop-off facility candidate.

For example, in the case in which the facility keyword is "here", the stop-off facility determinator determines that the shorter the distance between the rest position and a stop-off facility candidate, the higher possibility that the vehicle has stopped off at this facility.

(3) In the Case of Using a Distance to the Rest Position

On the basis of the rest position and map information including information about facilities located in an area surrounding this position, the stop-off facility determinator 5 determines that there is a high possibility that the vehicle has stopped off at a facility at a distance closer to the rest position.

(4) In the Case of Using the Rest Time

The stop-off facility determinator 5 determines stop-off facility candidates on the basis of the rest position and map information including information about facilities located in an area surrounding this position, compares an expected rest time specified for each of the facility genres of the stop-off facility candidates, and the time (rest time) which has elapsed after the vehicle has been at rest, and determines that there is a high possibility that the vehicle has stopped off at a facility, among the stop-off facility candidates, having a smaller difference between the expected rest time and the elapsed time. As a specification of the expected rest time, for example, there can be a case in which "5 minutes" is specified for convenience stores as a time required to have slight shopping, and "30 minutes" is specified for restaurants as a time required to have a meal. The expected rest time falls within the above-mentioned intermediate time period.

(5) In the Case of Performing an Overall Evaluation on (1) to (4) to Perform the Determination The stop-off facility determinator 5 performs the determination by using all or any two of the above-mentioned methods (1) to (4), provides a predetermined score for the facility candidate which is determined, in each of the determinations, to provide a higher possibility that the vehicle has stopped off at the facility candidate, and determines that the facility candidate having the highest sum total of scores is the stop-off facility.

The voice acquirer 6 acquires the user's uttered voice, collects the voice by using a microphone placed in the vehicle, and A/D (Analog/Digital) converts the voice signal by using, for example, PCM (Pulse Code Modulation). Further, in the case in which the evaluation information posting device 1 is a mobile terminal carried in the vehicle, the voice acquirer 6 is a microphone mounted in this mobile terminal.

There is, as the time when the voice acquirer 6 acquires a voice, a case in which the microphone is activated at all times to acquire the user's uttered voice.

As an alternative, the voice acquirer 6 can be activated at a specific time which is set in advance, to acquire the user's uttered voice. For example, when the user returns and gets on the vehicle after he or she has parked the vehicle and stopped off at a facility, and then starts the engine of the vehicle again, the voice acquirer 6 is also activated to cause this voice acquirer to acquire the user's uttered voice. In this case, the user's voice is acquired at a time when the user is not conscious of the acquisition.

In addition, the voice acquirer 6 can acquire the user's voice at a time specified by the user. For example, there can be a case in which the user is enabled to press down a sound-collecting button to also activate the voice acquirer 6 to acquire the user's uttered voice.

The facility keyword extractor 7 has a function of extracting a facility keyword from the uttered voice acquired by the voice acquirer 6.

The facility keyword is a keyword showing a facility. For example, the facility keyword includes at least one of a keyword specific to the facility, such as a facility name, as a facility genre, and a keyword showing a location, such as "here" or "there".

The evaluation keyword extractor 8 has a function of extracting a keyword (described as an evaluation keyword from here on) about an evaluation of a facility from the uttered voice acquired by the voice acquirer 6.

The evaluation keyword is a keyword showing an evaluation of the facility. For example, as the evaluation keyword, a keyword showing taste, olfaction, or tactile sense, such as "delicious", "bad-tasting", "spicy", "sweet", "hot", or "tepid", is provided.

Further, the facility keyword extractor 7 and the evaluation keyword extractor 8 detect a voice section corresponding to an uttered content from the voice signal of the uttered voice which is acquired and digitized by the voice acquirer 6, extract a feature quantity of voice data about this voice section, and performs a recognition process on the basis of the feature quantity and by using a voice recognition dictionary, to extract keywords.

The facility keyword extractor and the evaluation keyword extractor have only to perform the recognition process by using a typical method, for example, an HMM (Hidden Markov Model) method.

The evaluation information generator 9 generates evaluation information about a stop-off facility by using both the stop-off facility information about the facility determined by the stop-off facility determinator 5, and the evaluation keyword extracted by the evaluation keyword extractor 8. For example, information including information specifying a stop-off facility, the user's evaluation, a facility stop-off time when the vehicle stopped off at the facility, and a facility sojourn time during which the vehicle stayed at the facility is automatically generated as the evaluation information.

The information specifying the stop-off facility is a facility name, a facility ID, a facility genre, the position of the facility (latitude and longitude), etc., and is an indispensable item in the evaluation information. Further, the user's evaluation is also an indispensable item in the evaluation information, and is set on the basis of the evaluation keyword. The information other than the user's evaluation is included in the stop-off facility information.

Although the user's evaluation can be a free comment, such as "delicious" or "bad-tasting", which is extracted from the uttered voice as an evaluation keyword, the user's evaluation can be alternatively replaced by a multi-grade evaluation such as "Good" or "Bad". In this case, an association of the free comment extracted as an evaluation keyword with an evaluation can be performed for each facility genre, as shown in FIGS. 2 and 3.

FIG. 2 is a diagram showing an association table showing an association between each evaluation keyword about a facility genre of "one-pot dish restaurant", and an evaluation content corresponding to this evaluation keyword. FIG. 3 is a diagram showing an association table showing an association between each evaluation keyword about a facility genre of "ice cream store", and an evaluation content corresponding to this evaluation keyword. The association tables as described above are stored in a memory from which the evaluation information generator 9 can read information, and, when generating evaluation information, they are read and referred to as needed.

For example, when the genre of the determined stop-off facility is "one-pot dish restaurant" and the free comment is "hot", the association table shown in FIG. 2 is referred to and the free comment is replaced by the multi-grade evaluation "Good." As a result, an evaluation showing that the stop-off facility is a good restaurant providing a well-heated pot is determined.

Further, when the genre of the determined stop-off facility is "ice cream shop" and the free comment is "tepid", the association table shown in FIG. 3 is referred to and the free comment is replaced by the multi-grade evaluation "Bad." As a result, an evaluation showing that the stop-off facility is a bad shop providing a not-quite cold ice cream is determined.

Although the association tables each showing an association between each evaluation keyword about a facility genre and an evaluation content corresponding to this evaluation keyword are shown in FIGS. 2 and 3, an association table showing an association between each evaluation keyword and an evaluation content corresponding to this evaluation keyword can be provided for each facility.

Further, when the user utters a plurality of evaluation keywords, the evaluated values of all extracted evaluation keywords can be integrated into an average keyword and the average keyword can be provided as a final evaluation.

For example, Good which is a multi-grade evaluation in the association table shown in FIG. 2 is defined as an evaluated value of 1 and Bad is a multi-grade evaluation in the association table shown in FIG. 2 is defined as an evaluated value of 0, and, when the user utters a plurality of evaluation keywords including "spicy", "hot", "tepid", and . . . after stopping off at a facility whose genre is "one-pot dish restaurant", the evaluated values of all the uttered evaluation keywords are integrated and judged, and an evaluation showing the facility is a "restaurant providing a spicy pod" is determined.

The posting processor 10 has a function of posting the evaluation information generated by the evaluation information generator 9 to the evaluation information managing server 200. In this case, the evaluation information managing server 200 is a server device that manages word-of-mouth marketing sites and so on which are connected to the network, receives a post of evaluation information and stores the evaluation information in its own storage, and enables a user who desires to browse word-of-mouth information to browse evaluation information.

For example, the posting processor 10 is configured with a communication device that communication-connects with the evaluation information managing server 200, and communication software that generates information for posting evaluation information in a communication format handled in communications with the evaluation information managing server 200, and posts the information.

The position information acquirer 2, the rest information acquirer 3, the stop-off facility determinator 5, the voice acquirer 6, the facility keyword extractor 7, the evaluation keyword extractor 8, the evaluation information generator 9, and the posting processor 10 are implemented as concrete units in each which hardware and software operate in cooperation with each other, respectively, by causing a microcomputer of an information processing device in which the evaluation information posting device 1 is configured to execute a program about the processing specific to the present invention.

Next, operations will be explained.

Figure 4:
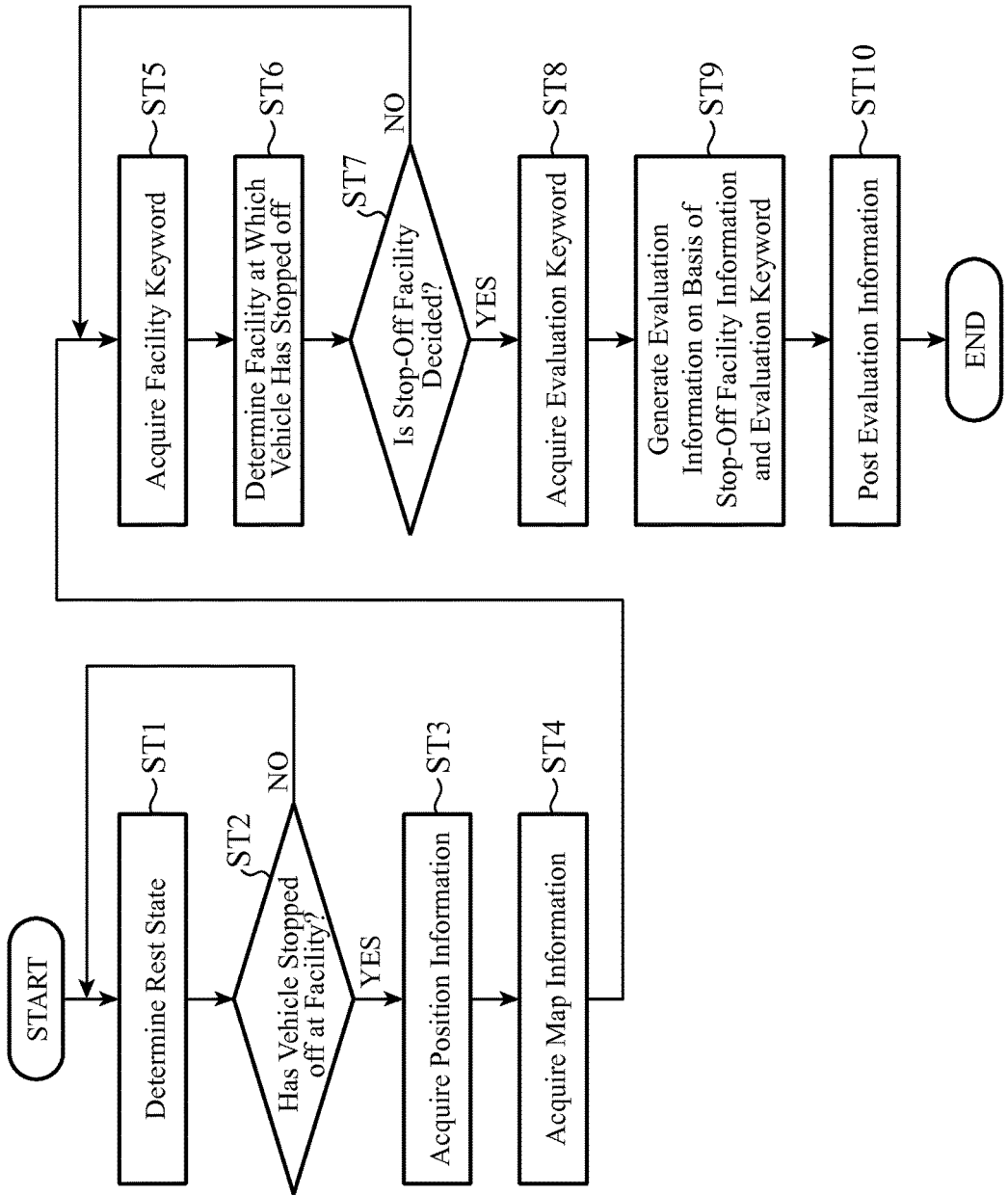
FIG. 4 is a flow chart showing an evaluation information posting method in accordance with Embodiment 1.

FIG. 4 is a flow chart showing an evaluation information posting method in accordance with Embodiment 1.

First, the stop-off facility determinator 5 determines the rest state of the vehicle on the basis of the rest information acquired by the rest information acquirer 3 (step ST1). For example, the stop-off facility determinator 5 can perform the determination by using the parking signal of the vehicle as the rest information, or can determine that the vehicle has been at rest when there is no transition of the vehicle position during a predetermined time period.

At that time, when the vehicle is determined to be travelling, the determination of step ST1 is repeated.

When it is determined that the vehicle is at rest, the stop-off facility determinator 5 determines whether the vehicle has stopped off at a facility (step ST2). For example, when the vehicle starts to travel within the predetermined lower limit time period after the time when the rest information was acquired, as mentioned above, the stop-off facility determinator determines that the rest is a one for waiting for a traffic signal, or the like, and then determines that the vehicle has not stopped off at any facility. In contrast, the vehicle starts to travel within the predetermined intermediate time period after the time when the rest information was acquired, the stop-off facility determinator determines that the vehicle has been parked since the vehicle has stopped off at a facility. When determining that the vehicle has not stopped off at any facility (when NO in step ST2), the stop-off facility determinator 5 returns to step ST1, and repeats the above-mentioned processes.

In contrast, when determining that the vehicle has stopped off at a facility (when YES in step ST2), the stop-off facility determinator 5 acquires the current position information about the vehicle acquired by the position information acquirer 2 (step ST3). Next, the stop-off facility determinator 5 reads and acquires map information including facility information about facilities located in an area surrounding the position shown by the position information from the map information storage 4 (step ST4). At that time, the facility keyword extractor 7 and the evaluation keyword extractor 8 extract keywords at a time in conjunction with that when the voice acquisition is performed by the voice acquirer 6, as mentioned above.

The stop-off facility determinator 5 acquires a facility keyword which the facility keyword extractor 7 extracts from a voice which the driver or a passenger of the vehicle (referred to as the user from here on) has uttered (step ST5).

The stop-off facility determinator 5 then determines a facility at which the user has stopped off with the vehicle by using the position information of the vehicle, the map information, the rest information, and the facility keyword which are acquired in the above-mentioned way (step ST6). For example, the stop-off facility determinator determines stop-off facility candidates which can be estimated to have been stopped off at with the vehicle by using the position information of the vehicle, the map information, and the rest information, and judges the stop-off facility candidates in order by using one of the above-mentioned methods (1) to (5), to decide a stop-off facility.

At that time, unless one stop-off facility is decided (when NO in step ST7), the stop-off facility determinator 5 returns to step ST5, and repeats above-mentioned determination.

When one stop-off facility is decided (when YES in step ST7), the stop-off facility determinator 5 outputs stop-off facility information about the decided facility to the evaluation information generator 9.

The stop-off facility information is configured by using the facility information about the facility included in the map information, and includes the facility stop-off time and the facility sojourn time in addition to the facility name, the facility ID, the facility genre, and the facility position (latitude and longitude).

When acquiring the stop-off facility information about the facility determined by the stop-off facility determinator 5, the evaluation information generator 9 acquires the evaluation keyword which the evaluation keyword extractor 8 extracts from the user's uttered voice (step ST8).

The evaluation information generator 9 then generates evaluation information about the stop-off facility by using both the stop-off facility information about the facility determined by the stop-off facility determinator 5, and the evaluation keyword extracted by the evaluation keyword extractor 8 (step ST9). For example, information including the information specifying the stop-off facility, the user's evaluation, the facility stop-off time, and the facility sojourn time is automatically generated as the evaluation information, as mentioned above.

After that, the posting processor 10 receives the evaluation information generated by the evaluation information generator 9, and posts the evaluation information to the evaluation information managing server 200 (step ST10).

The posting processor can display the evaluation information on a display screen to cause the user to check the evaluation information before posting the evaluation information, and can post the evaluation information when receiving an approval from the user.

As mentioned above, because the evaluation information posting device in accordance with this Embodiment 1 includes: the position information acquirer 2 to acquire the position information about the vehicle; the voice acquirer 6 to acquire an uttered voice; the facility keyword extractor 7 to extract a keyword about a facility from the uttered voice acquired by the voice acquirer 6; the evaluation keyword extractor 8 to extract a keyword about an evaluation from the uttered voice acquired by the voice acquirer 6; the rest information acquirer 3 to acquire rest information showing that the vehicle has been at rest; the stop-off facility determinator 5 to determine the rest state of the vehicle on the basis of the rest information which the rest information acquirer 3 has acquired, and determine a facility at which the vehicle has stopped off by using position information about the rest position of the vehicle which is acquired by the position information acquirer 2, map information including facility information about facilities located in an area surrounding the position shown by this position information, and a keyword about a facility at the rest position of the vehicle which is extracted by the facility keyword extractor 7; the evaluation information generator 9 to, by using both facility information about the facility determined by the stop-off facility determinator 5, and a keyword about an evaluation which is extracted for this facility by the evaluation keyword extractor 8, generate evaluation information about this facility; and the posting processor 10 to post the evaluation information generated by the evaluation information generator 9 to the evaluation information managing server 200. By automatically generating evaluation information about a facility at which the user has stopped off by using the rest information of the vehicle and an uttered voice and then posting the evaluation information to the evaluation information managing server 200 in this way, the evaluation information posting device can reduce the load on the user of generating and posting evaluation information, and can also establish increase in the number of posts.

Further, in the case in which the evaluation information posting device 1 is a vehicle-mounted device, as shown in Embodiment 1, dedicated devices which should be added for the present invention can be reduced, and introduction of the present invention can be implemented at a low cost.

More specifically, a GPS device disposed standardly in the vehicle can be used as the position information acquirer 2, a parking signal acquisition device that acquires a parking signal can be used as the rest information acquirer 3, and a vehicle-mounted microphone can be used as the voice acquirer 6.

Embodiment 2

Figure 5:
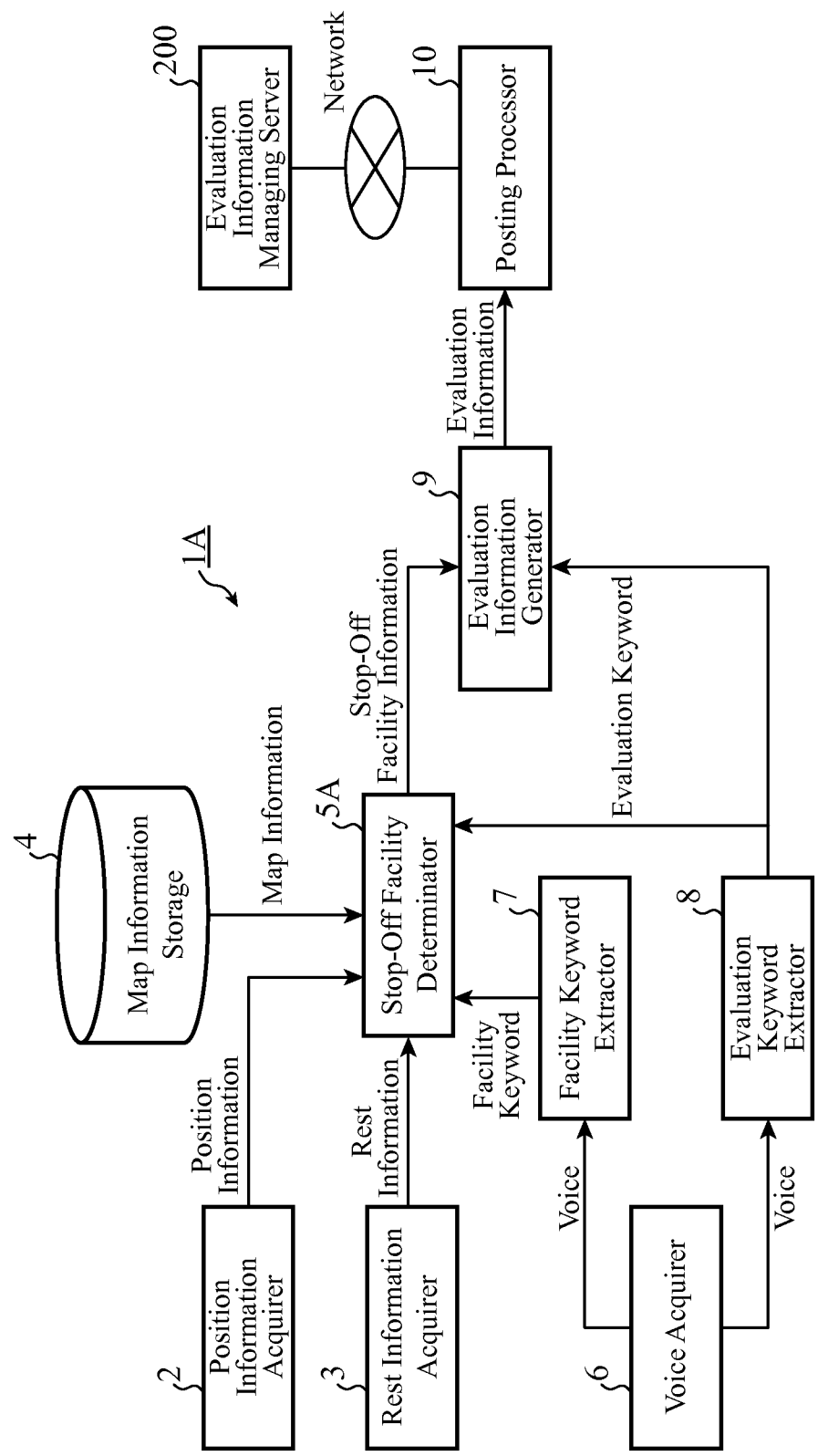
FIG. 5 is a block diagram showing the configuration of an evaluation information posting device in accordance with Embodiment 2 of the present invention.

FIG. 5 is a block diagram showing the configuration of an evaluation information posting device in accordance with Embodiment 2 of the present invention. Referring to FIG. 5, the evaluation information posting device 1A is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5A, a voice acquirer 6, a facility keyword extractor 7, an evaluation keyword extractor 8, an evaluation information generator 9, and a posting processor 10. In FIG. 5, the same components as those shown in FIG. 1 are denoted by the same reference numerals, and the explanation of the components will be omitted hereafter.

The stop-off facility determinator 5A determines a facility at which the vehicle has stopped off by using an evaluation keyword extracted by the evaluation keyword extractor 8 in addition to position information acquired by the position information acquirer 2, map information read from the map information storage 4 and including facility information about facilities located in an area surrounding the position shown by the above-mentioned position information, rest information showing that the vehicle has been at rest, and a facility keyword. More specifically, the stop-off facility determinator in accordance with this Embodiment 2 finally decides a facility candidate which mostly matches the evaluation keyword, among the stop-off facility candidates, as a stop-off facility.

The position information acquirer 2, the rest information acquirer 3, the stop-off facility determinator 5A, the voice acquirer 6, the facility keyword extractor 7, the evaluation keyword extractor 8, the evaluation information generator 9, and the posting processor 10 are implemented as concrete units in each which hardware and software operate in cooperation with each other, respectively, by causing a microcomputer of an information processing device in which the evaluation information posting device 1A is configured to execute a program about the processing specific to the present invention.

Next, operations will be explained.

FIG. 6 is a flow chart showing an example of a stop-off facility determining process in Embodiment 2. First, the stop-off facility determinator 5A determines stop-off facility candidates which can be estimated to have been stopped off at by the user with the vehicle by using the position information of the vehicle, map information including facility information about facilities located in an area surrounding the position shown by this position information, the rest information, and the facility keyword (step ST1a), like that in accordance with Embodiment 1.

Next, the stop-off facility determinator 5A acquires an evaluation keyword which the evaluation keyword extractor 8 extracts from the user's uttered voice (step ST2a).

Next, the stop-off facility determinator 5A selects facility candidates each of which matches the evaluation keyword from the stop-off facility candidates determined in step ST1a by referring to an association table showing an association between each set of evaluation keywords and a facility genre corresponding to this set of evaluation keywords, and decides a candidate which mostly matches the evaluation keyword as a stop-off facility (step ST3a).

FIG. 7 is a diagram showing the association table showing an association between each set of evaluation keywords and a facility genre corresponding to this set of evaluation keywords. The stop-off facility determinator 5A refers to the association table as shown in FIG. 7, and compares the evaluation keyword and the facility genre of each stop-off facility candidate to select a matching candidate.

For example, when facilities whose facility genre is ramen shop and facilities whose facility genre is ice cream shop are determined as stop-off facility candidates located in an area surrounding a rest position, and "hot" and "spicy" are extracted as evaluation keywords, the stop-off facility determinator 5A determines that there is a high possibility that the vehicle has stopped off at a facility whose facility genre matches the evaluation keywords "hot" and "spicy" and is ramen shop by referring to the association table of FIG. 7.

After that, the stop-off facility determinator decides the facility candidate whose facility genre mostly matches the plurality of evaluation keywords as a stop-off facility.

As mentioned above, in the evaluation information posting device in accordance with this Embodiment 2, the stop-off facility determinator 5A determines a facility at which the vehicle has stopped off by using evaluation keywords about the facility which are extracted by the evaluation keyword extractor 8.

By configuring the evaluation information posting device in this way, when a plurality of facilities exist in an area surrounding the rest position, the evaluation information posting device can improve the precision of the stop-off facility determination.

Embodiment 3

Figure 8:
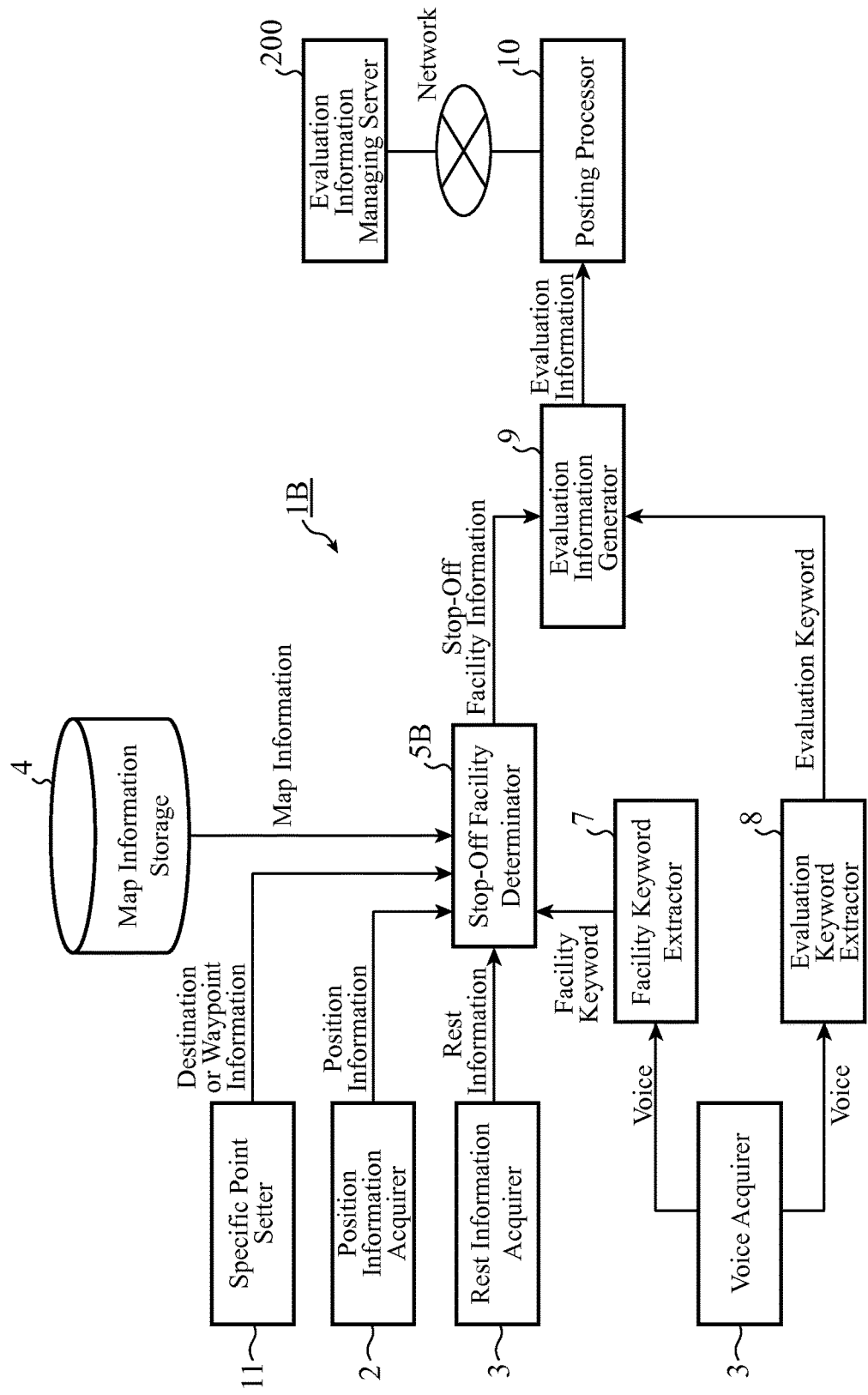
FIG. 8 is a block diagram showing the configuration of an evaluation information posting device in accordance with Embodiment 3 of the present invention.

FIG. 8 is a block diagram showing the configuration of an evaluation information posting device in accordance with Embodiment 3 of the present invention. Referring to FIG. 8, the evaluation information posting device 1B is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5B, a voice acquirer 6, a facility keyword extractor 7, an evaluation keyword extractor 8, an evaluation information generator 9, a posting processor 10, and a specific point setter 11. In FIG. 8, the same components as those shown in FIG. 1 are denoted by the same reference numerals, and the explanation of the components will be omitted hereafter.

The stop-off facility determinator 5B determines a facility at which the vehicle has stopped off by using point information set by the specific point setter 11 in addition to position information acquired by the position information acquirer 2, map information read from the map information storage 4 and including facility information about facilities located in an area surrounding the position shown by the above-mentioned position information, rest information showing that the vehicle has been at rest, and a facility keyword.

The specific point setter 11 has a function of accepting a setting of point information about a point at which the vehicle will stop off. For example, in the case in which the evaluation information posting device 1B is configured as one function of a vehicle-mounted navigation device, information about a destination or a waypoint set to the navigation device corresponds to the point information about a point (specific point) at which the vehicle will stop off.

Further, this point at which the vehicle will stop off is a facility to or via which the vehicle is scheduled to be destined or go, the point information is facility information about this facility.

The position information acquirer 2, the rest information acquirer 3, the stop-off facility determinator 5B, the voice acquirer 6, the facility keyword extractor 7, the evaluation keyword extractor 8, the evaluation information generator 9, the posting processor 10, and the specific point setter 11 are implemented as concrete units in each which hardware and software operate in cooperation with each other, respectively, by causing a microcomputer of an information processing device in which the evaluation information posting device 1B is configured to execute a program about the processing specific to the present invention.

Next, operations will be explained.

Figure 9:
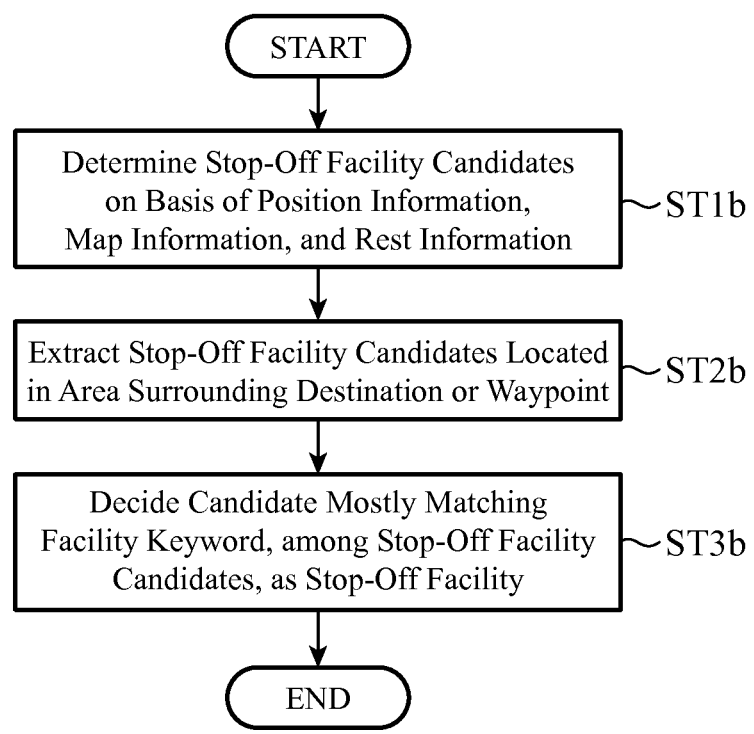
FIG. 9 is a flow chart showing an example of a stop-off facility determining process in Embodiment 3.

FIG. 9 is a flow chart showing an example of a stop-off facility determining process in Embodiment 3. First, the stop-off facility determinator 5B determines stop-off facility candidates which can be estimated to have been stopped off at by the user with the vehicle by using the position information of the vehicle, the map information including the position shown by this position information, and the rest information (step ST1b), like that in accordance with Embodiment 1.

Next, the stop-off facility determinator 5B selects and extracts stop-off facility candidates located in an area surrounding the specific point (the destination or the waypoint) shown by the point information set by the specific point setter 11 from among the stop-off facility candidates determined in step ST1b (step ST2b).

After that, the stop-off facility determinator 5B decides a stop-off facility by comparing each of the stop-off facility candidates located in an area surrounding the destination or the waypoint and the facility keyword, and selecting a facility candidate which mostly matches the facility keyword (step ST3b).

When the facility at the destination or the waypoint is a complex facility, the stop-off facility determinator can decide this facility as the stop-off facility by determining whether the facility matches the above-mentioned facility keyword, or can decide the facility as the stop-off facility by determining whether the facility matches an evaluation keyword, like that in accordance with Embodiment 2.

As mentioned above, the evaluation information posting device in accordance with this Embodiment 3 includes the specific point setter 11 that accepts an setting of point information about a point at which the vehicle will stop off, and the stop-off facility determinator 5B determines a facility at which the vehicle has stopped off by using the point information a setting of which is accepted by the specific point setter 11.

By using information about a destination or a waypoint set to a navigation device for the stop-off facility determination in this way, the evaluation information posting device can improve the precision of the stop-off facility determination.

Embodiment 4

Figure 10:
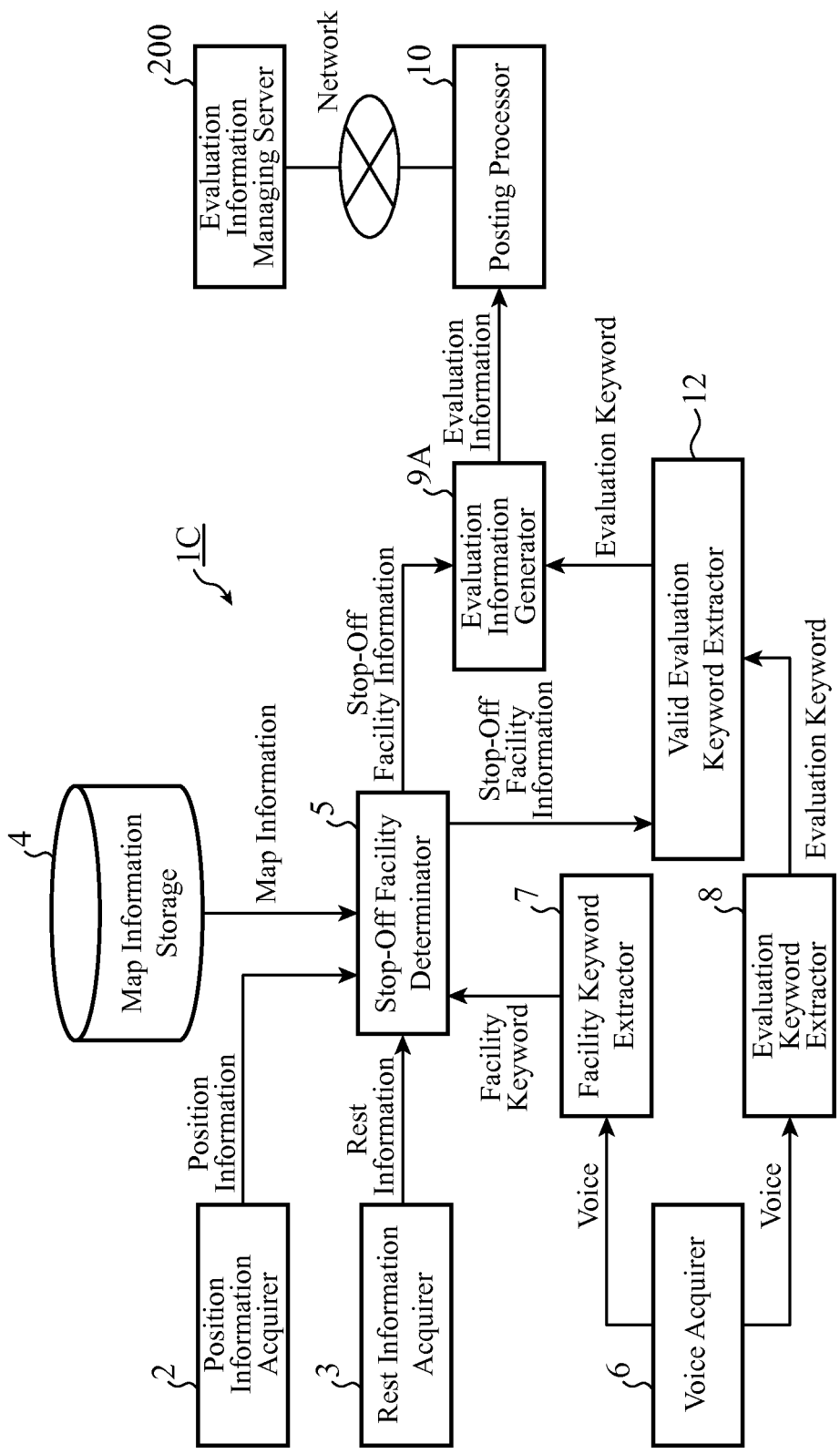
FIG. 10 is a block diagram showing the configuration of an evaluation information posting device in accordance with Embodiment 4 of the present invention.

FIG. 10 is a block diagram showing the configuration of an evaluation information posting device in accordance with Embodiment 4 of the present invention. Referring to FIG. 10, the evaluation information posting device 1C is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5, a voice acquirer 6, a facility keyword extractor 7, an evaluation keyword extractor 8, an evaluation information generator 9A, a posting processor 10, and a valid evaluation keyword extractor 12. In FIG. 10, the same components as those shown in FIG. 1 are denoted by the same reference numerals, and the explanation of the components will be omitted hereafter.

The evaluation information generator 9A has a function of, by using both stop-off facility information about a facility determined by the stop-off facility determinator 5 and evaluation keywords extracted by the valid evaluation keyword extractor 12, generating evaluation information about this facility.

Further, the valid evaluation keyword extractor 12 extracts an evaluation keyword for the facility determined by the stop-off facility determinator 5 from the evaluation keywords extracted by the evaluation keyword extractor 8 by using the stop-off facility information about the facility determined by the stop-off facility determinator 5.

The position information acquirer 2, the rest information acquirer 3, the stop-off facility determinator 5, the voice acquirer 6, the facility keyword extractor 7, the evaluation keyword extractor 8, the evaluation information generator 9A, the posting processor 10, and the valid evaluation keyword extractor 12 are implemented as concrete units in each which hardware and software operate in cooperation with each other, respectively, by causing a microcomputer of an information processing device in which the evaluation information posting device 1C is configured to execute a program about the processes specific to the present invention.

Next, operations will be explained.

FIG. 11 is a flow chart showing an example of an evaluation information generating process in Embodiment 4.

First, the valid evaluation keyword extractor 12 extracts the facility genre of the stop-off facility from the stop-off facility information about the facility determined by the stop-off facility determinator 5 (step ST1c).

Next, the valid evaluation keyword extractor 12 acquires the evaluation keywords extracted by the evaluation keyword extractor 8 (step ST2c).

Next, the valid evaluation keyword extractor 12 extracts a valid evaluation keyword which matches the facility genre determined in step ST1c from the evaluation keywords extracted by the evaluation keyword extractor 8 by referring to an association table showing an association between each facility genre of stop-off facilities, and evaluation keywords valid for this facility (step ST3c).

After that, by using both the stop-off facility information about the facility determined by the stop-off facility determinator 5 and the valid evaluation keyword extracted by the valid evaluation keyword extractor 12, the evaluation information generator 9A generates evaluation information about the stop-off facility (step ST4c).

FIG. 12 is a diagram showing the association table showing an association between each facility genre and evaluation keywords corresponding to this facility genre. The association table as shown in FIG. 12 is stored in a memory from which information can be read by the valid evaluation keyword extractor 12. When extracting a valid evaluation keyword, the valid evaluation keyword extractor 12 reads and refers to the above-mentioned association table as needed.

For example, when the facility genre of the stop-off facility determined by the stop-off facility determinator 5 is hot spring, a keyword associated with "hot spring", such as "hot" or "crowded", is extracted as a valid evaluation keyword from among the evaluation keywords extracted by the evaluation keyword extractor 8.

Although the association table showing an association between each facility genre and evaluation keywords corresponding to this facility genre is shown in FIG. 12, an association table showing an association with corresponding evaluation keywords can be provided for each facility.

As mentioned above, the evaluation information posting device in accordance with this Embodiment 4 includes the valid evaluation keyword extractor 12 to extract a keyword about an evaluation of a facility determined by the stop-off facility determinator 5 from among keywords about an evaluation which are extracted by the evaluation keyword extractor 8, and the evaluation information generator 9A generates evaluation information about this facility by using both stop-off facility information about the facility at which the vehicle has stopped off and the keyword extracted by the valid evaluation keyword extractor 12. By configuring the evaluation information posting device in this way, the evaluation information posting device can post only an appropriate evaluation keyword, as evaluation information, for a facility, and can provide an improvement in the quality of the evaluation information.

Embodiment 5

Figure 13:
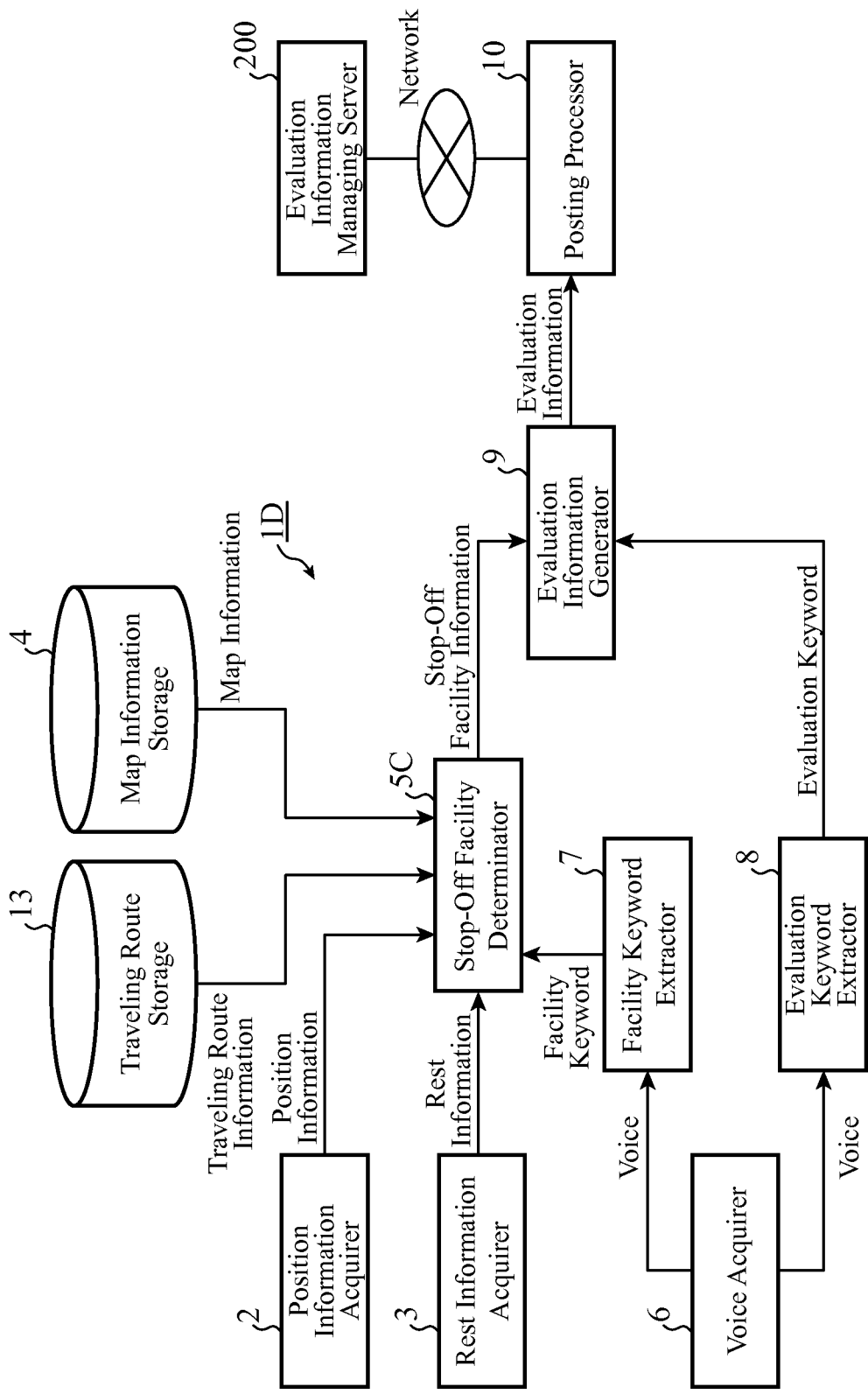
FIG. 13 is a block diagram showing the configuration of an evaluation information posting device in accordance with Embodiment 5 of the present invention.

FIG. 13 is a block diagram showing the configuration of an evaluation information posting device in accordance with Embodiment 5 of the present invention. Referring to FIG. 13, the evaluation information posting device 1D is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5C, a voice acquirer 6, a facility keyword extractor 7, an evaluation keyword extractor 8, an evaluation information generator 9, a posting processor 10, and a traveling route storage 13. In FIG. 13, the same components as those shown in FIG. 1 are denoted by the same reference numerals, and the explanation of the components will be omitted hereafter.

The stop-off facility determinator 5C determines a facility at which the vehicle has stopped off by using traveling route information (route information) read from the traveling route storage 13 in addition to position information acquired by the position information acquirer 2, map information read from the map information storage 4 and including facility information about facilities located in an area surrounding the position shown by the above-mentioned position information, rest information showing that the vehicle has been at rest, and a facility keyword.

The traveling route information is information about a route along which the vehicle is travelling, and is road information about roads connecting among points, such as a place of departure, a current position, waypoints, and a destination.

The traveling route storage 13 stores the traveling route information (route information) about the route along which the vehicle is travelling, and is configured in either a storage, such as a hard disk drive unit (HDD) mounted in the vehicle-mounted device, or a storage disposed in an external device, such as a server or a smart phone, connected to a network. For example, there can be considered a case in which when the evaluation information posting device 1D is configured as one function of a vehicle-mounted navigation device, storing the traveling route information in the traveling route storage 13 is implemented by the navigation device.

The position information acquirer 2, the rest information acquirer 3, the stop-off facility determinator 5C, the voice acquirer 6, the facility keyword extractor 7, the evaluation keyword extractor 8, the evaluation information generator 9, the posting processor 10, and the traveling route storage 13 are implemented as concrete units in each which hardware and software operate in cooperation with each other, respectively, by causing a microcomputer of an information processing device in which the evaluation information posting device 1D is configured to execute a program about the processes specific to the present invention.

Next, operations will be explained.

Figure 14:
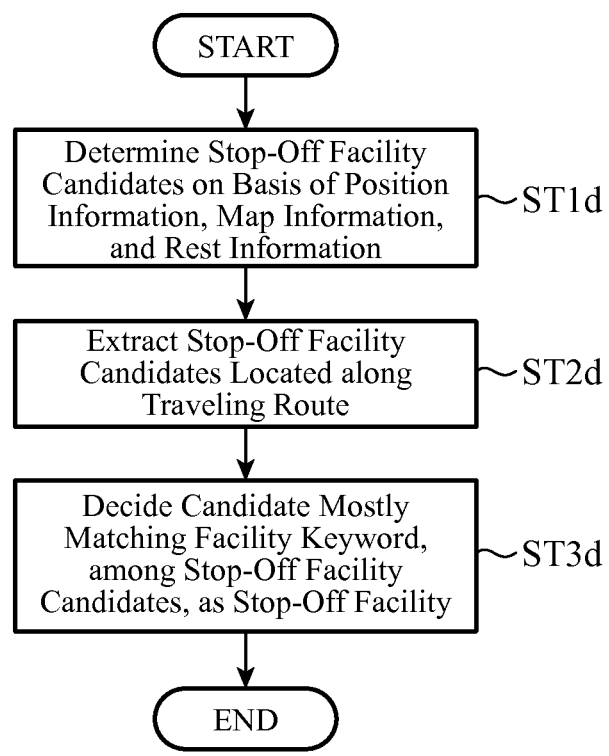
FIG. 14 is a flow chart showing an example of a stop-off facility determining process in Embodiment 5.

FIG. 14 is a flow chart showing an example of a stop-off facility determining process in Embodiment 5. First, the stop-off facility determinator 5C determines stop-off facility candidates which can be estimated to have been stopped off at by the user with the vehicle by using the position information of the vehicle, the map information including the facility information about facilities located in an area surrounding the position shown by this position information, and the rest information (step ST1d), like that in accordance with Embodiment 1.

Next, the stop-off facility determinator 5C reads the traveling route information corresponding to the rest position of the vehicle from the traveling route storage 13 by using both the position information about the vehicle and the rest information, and extracts facility candidates located along the route shown by this traveling route information from among the stop-off facility candidates determined in step ST1d (step ST2d). In this way, the facilities located along the route along which the vehicle is travelling are extracted as facilities having a high possibility that the vehicle has stopped off thereat.

After that, the stop-off facility determinator 5C decides a stop-off facility by comparing each of the facility candidates located along the route shown by the traveling route information and the facility keyword, and selecting a facility candidate which mostly matches the facility keyword (step ST3*d*).

As mentioned above, the evaluation information posting device in accordance with this Embodiment 5 includes the traveling route storage 13 to store the traveling route information about the route along which the vehicle is travelling, and the stop-off facility determinator 5C determines the facility at which the vehicle has stopped off by using the traveling route information read from the traveling route storage 13.

By doing in this way, the evaluation information posting device can improve the precision of the stop-off facility determination. For example, it is hard to judge that when the vehicle travelling a local street crossing a highway on overpass or underpass has been at rest, the vehicle has stopped off at a service area on the highway. In this case, in accordance with Embodiment 5, because consistency is low between service areas and the traveling route, it is determined that there is a low possibility that the vehicle has stopped off at any service area.

Embodiment 6

Figure 15:
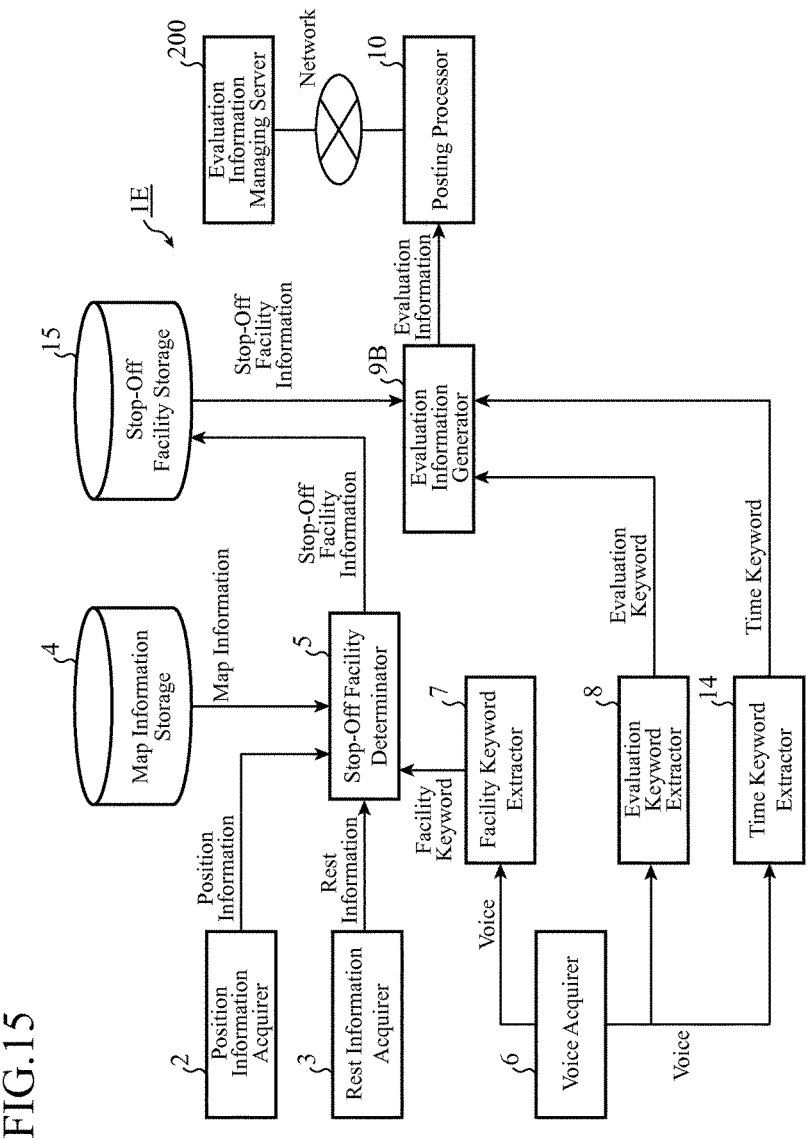
FIG. 15 is a block diagram showing the configuration of an evaluation information posting device in accordance with Embodiment 6 of the present invention.

FIG. 15 is a block diagram showing the configuration of an evaluation information posting device in accordance with Embodiment 6 of the present invention. Referring to FIG. 15, the evaluation information posting device 1E is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5, a voice acquirer 6, a facility keyword extractor 7, an evaluation keyword extractor 8, an evaluation information generator 9B, a posting processor 10, a time keyword extractor 14, and a stop-off facility storage 15. In FIG. 15, the same components as those shown in FIG. 1 are denoted by the same reference numerals, and the explanation of the components will be omitted hereafter.

The evaluation information generator 9B reads stop-off facility information about a facility at which the vehicle stopped off at the time shown by a keyword extracted by the time keyword extractor 14 from the stop-off facility storage 15, and generates evaluation information about this facility by using both this stop-off facility information and a keyword about an evaluation which is extracted by the evaluation keyword extractor 8.

The time keyword extractor 14 has a function of extracting a keyword about a time from an uttered voice acquired by the voice acquirer 6. A keyword about a time (described as a time keyword from here on) is a keyword showing a time or a keyword which is extracted by performing voice recognition on an utterance including time keyword.

For example, a keyword, such as "I went yesterday" or "I went yesterday for lunch", is provided.

The stop-off facility storage 15 stores pieces of stop-off facility information about facilities at which the vehicle stopped off. For example, the stop-off facility storage 15 is configured in either a storage, such as a hard disk drive unit (HDD) mounted in the vehicle-mounted device, or a storage disposed in an external device, such as a server or a smart phone, connected to a network.

The position information acquirer 2, the rest information acquirer 3, the stop-off facility determinator 5, the voice acquirer 6, the facility keyword extractor 7, the evaluation keyword extractor 8, the evaluation information generator 9B, the posting processor 10, and the time keyword extractor 14 are implemented as concrete units in each which hardware and software operate in cooperation with each other, respectively, by causing a microcomputer of an information processing device in which the evaluation information posting device 1E is configured to execute a program about the processing specific to the present invention.

Figure 16:
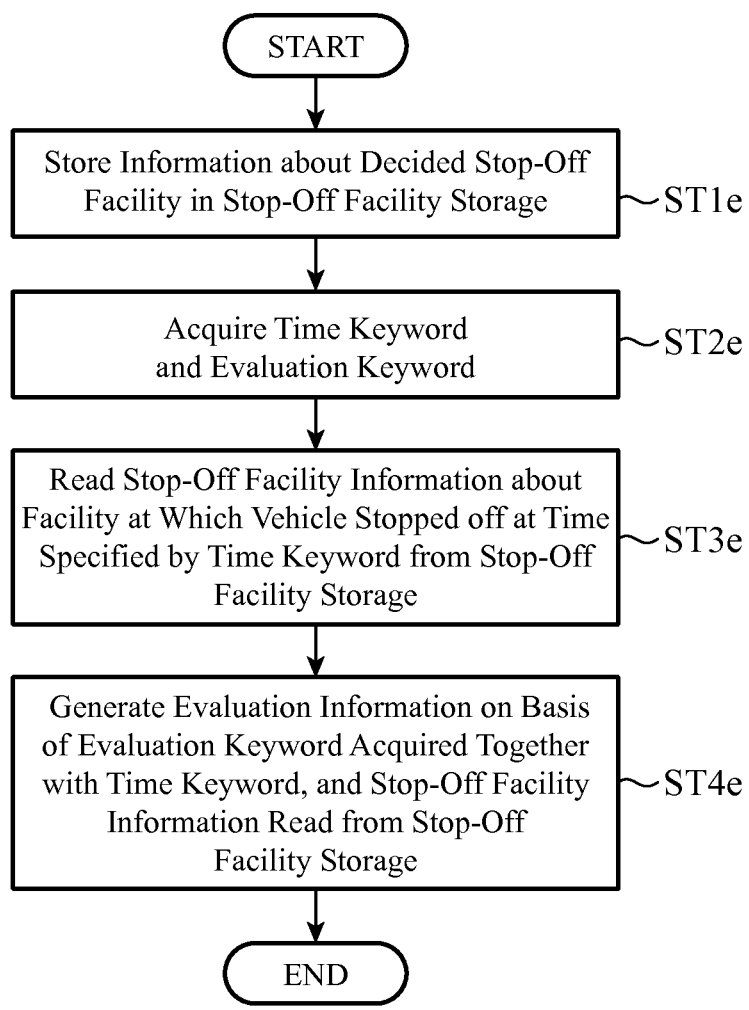
FIG. 16 is a flow chart showing an example of an evaluation information generating process in Embodiment 6.

FIG. 16 is a flow chart showing an example of an evaluation information generating process in Embodiment 6. When deciding a stop-off facility, the stop-off facility determinator 5 stores stop-off facility information about this facility in the stop-off facility storage 15 (step ST1*e*).

At that time, the time keyword extractor 14 extracts a time keyword from an uttered voice acquired by the voice acquirer 6 at a time in conjunction with that when voice acquisition is performed by the voice acquirer 6, which is explained in Embodiment 1.

Next, the evaluation information generator 9B acquires the time keyword extracted by the time keyword extractor 14, and an evaluation keyword extracted by the evaluation keyword extractor 8 (step ST2*e*).

The evaluation information generator 9B then reads the stop-off facility information about the facility at which the vehicle stopped off at the time shown by the time keyword from the stop-off facility storage 15 (step ST3*e*). For example, the evaluation information generator compares the stop-off time included in each stop-off facility information and the time shown by the time keyword, to select the stop-off facility information about the facility at which the vehicle stopped off at the time shown by the time keyword.

After that, by using both the stop-off facility information read in step ST3*e*, and the evaluation keyword extracted by the evaluation keyword extractor 8, the evaluation information generator 9B generates evaluation information about this facility (step ST4*e*).

For example, when the user utters "The ramen shop to which I went yesterday for lunch was delicious", "yesterday for lunch" is extracted as a time keyword, the stop-off facility information corresponding to this time is read, and "delicious" is further extracted as an evaluation keyword, and evaluation information in which this evaluation keyword is linked with the stop-off facility information is generated.

As mentioned above, the evaluation information posting device in accordance with this Embodiment 6 includes the time keyword extractor 14 to extract a time keyword from an uttered voice acquired by the voice acquirer 6, and the stop-off facility storage 15 to store stop-off facility information about facilities at which the vehicle stopped off, and the evaluation information generator 9B reads the stop-off facility information about the facility at which the vehicle stopped off at the time specified by the keyword extracted by the time keyword extractor 14 from the stop-off facility storage 15, and, by using both this stop-off facility information and an evaluation keyword extracted by the evaluation keyword extractor 8, generates evaluation information about this facility. By configuring the evaluation information posting device in this way, even in a case in which immediately after stopping off at a facility, the user does not evaluate this facility, the evaluation information posting device can generate evaluation information about the facility at which the user stopped off at the past time shown by the time keyword. As a result, even in a case which after a lapse of several days since the user stopped off at a facility, the user utters an evaluation keyword as though he or she remembers, the evaluation information posting device can generate and post evaluation information.

Embodiment 7

Figure 17:
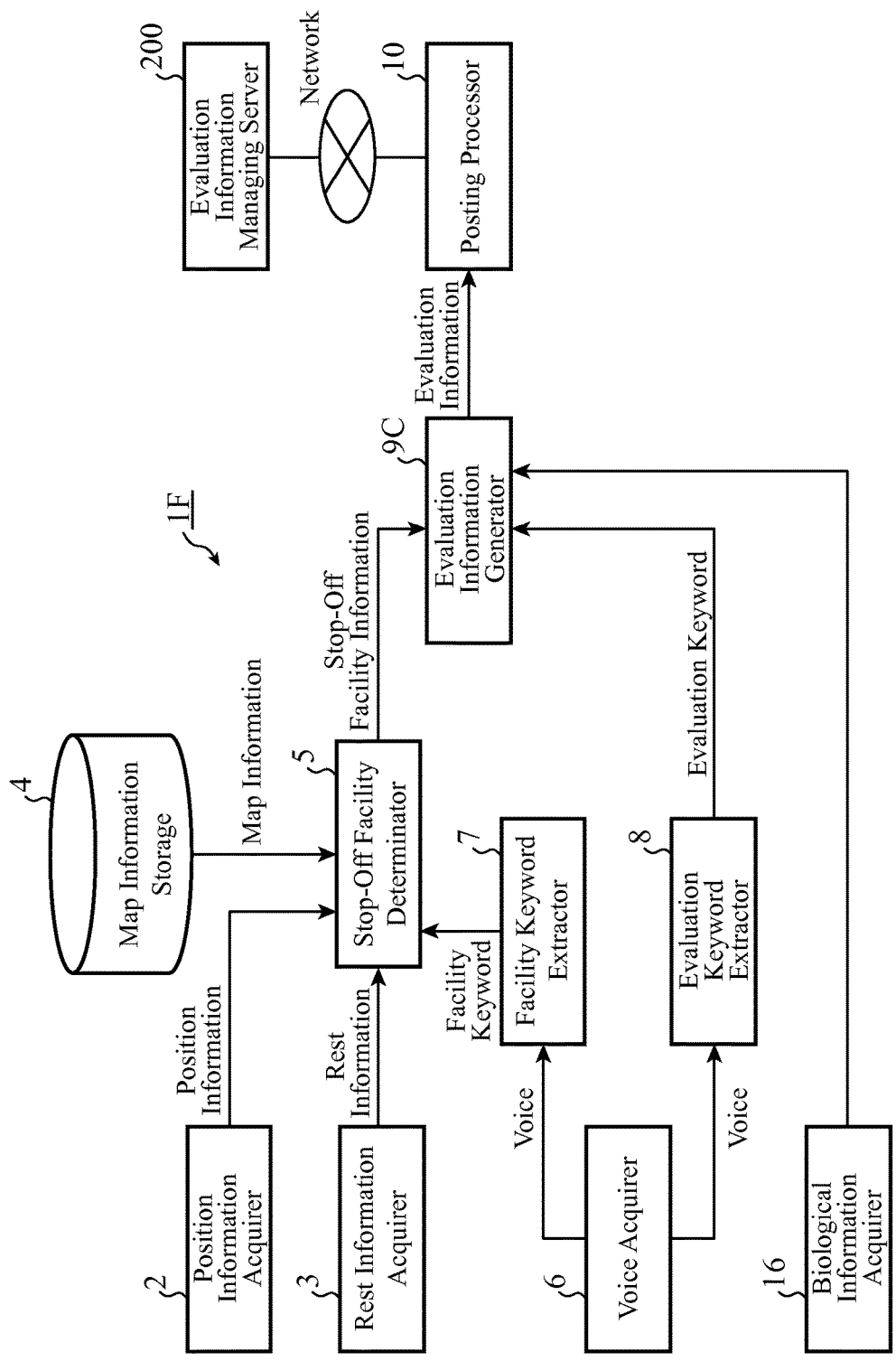
FIG. 17 is a block diagram showing the configuration of an evaluation information posting device in accordance with Embodiment 7 of the present invention.

FIG. 17 is a block diagram showing the configuration of an evaluation information posting device in accordance with Embodiment 7 of the present invention. Referring to FIG. 17, the evaluation information posting device 1F is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5, a voice acquirer 6, a facility keyword extractor 7, an evaluation keyword extractor 8, an evaluation information generator 9C, a posting processor 10, and a biological information acquirer 16. In FIG. 17, the same components as those shown in FIG. 1 are denoted by the same reference numerals, and the explanation of the components will be omitted hereafter.

The position information acquirer 2, the rest information acquirer 3, the stop-off facility determinator 5, the voice acquirer 6, the facility keyword extractor 7, the evaluation keyword extractor 8, the evaluation information generator 9C, the posting processor 10, and the biological information acquirer 16 are implemented as concrete units in each which hardware and software operate in cooperation with each other, respectively, by causing a microcomputer of an information processing device in which the evaluation information posting device 1F is configured to execute a program about the processes specific to the present invention.

By using biological information acquired by the biological information acquirer 16 in addition to stop-off facility information about the facility determined by the stop-off facility determinator 5, and an evaluation keyword extracted by the evaluation keyword extractor 8, the evaluation information generator 9C generates evaluation information about this facility.

The biological information acquirer 16 has a function of acquiring the user's biological information. For example, the biological information acquirer is connected to a brain wave sensor, a scale, a clinical thermometer, and so on, which are disposed in the vehicle cabin, to acquire a brain wave, the weight, and the body temperature as the user's biological information.

Particularly, even in a case in which the user does not make an utterance including any evaluation keyword, the evaluation information generator 9C generates evaluation information about the facility at which the user has stopped off by using the biological information acquired by the biological information acquirer 16.

For example, when the user's brain wave is stable after the user has used a hot spring, evaluation information including an evaluation showing "hot spring where the user can relax" is generated.

Further, when the user's weight increases after the user has used a restaurant, evaluation information including an evaluation "restaurant where the user can eat fully" is generated.

In addition, when the user's body temperature rises greatly after the user has used a restaurant, evaluation information including an evaluation "restaurant where the user can eat a meal suitable when cold" is generated.

As mentioned above, the evaluation information posting device in accordance with this Embodiment 7 includes the biological information acquirer 16 to acquire the user's biological information, and the evaluation information generator 9B generates evaluation information about the facility at which the vehicle has stopped off by using the biological information acquired by the biological information acquirer 16. By configuring the evaluation information posting device in this way, even in a case in which the user does not utter any detailed evaluation, the evaluation information posting device can generate evaluation information having a high degree of precision which is based on the user's actual experience.

Embodiment 8

Figure 18:
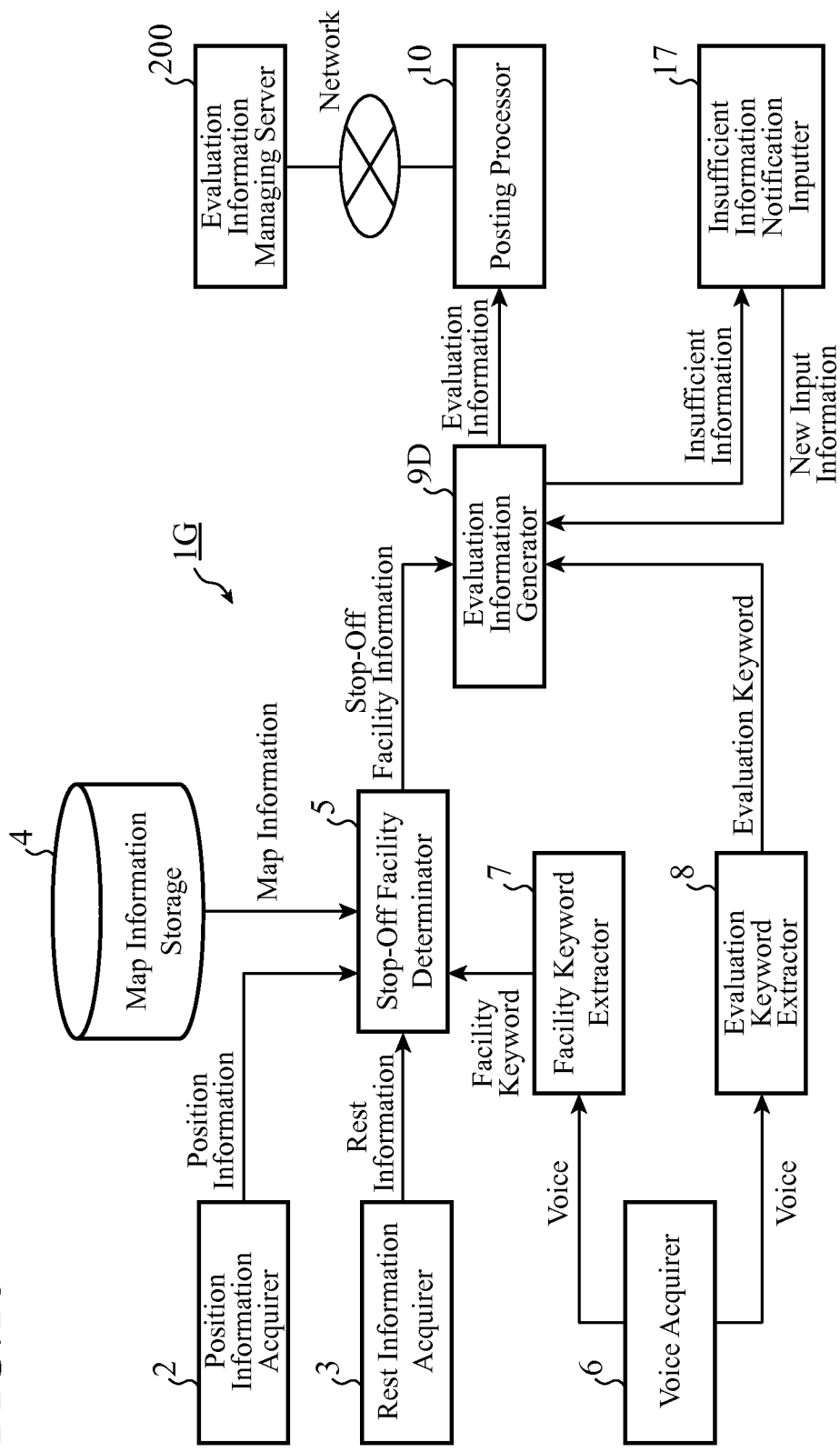
FIG. 18 is a block diagram showing the configuration of an evaluation information posting device in accordance with Embodiment 8 of the present invention.

FIG. 18 is a block diagram showing the configuration of an evaluation information posting device in accordance with Embodiment 8 of the present invention. Referring to FIG. 18, the evaluation information posting device 1G is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5, a voice acquirer 6, a facility keyword extractor 7, an evaluation keyword extractor 8, an evaluation information generator 9D, a posting processor 10, and an insufficient information notification inputter 17. In FIG. 18, the same components as those shown in FIG. 1 are denoted by the same reference numerals, and the explanation of the components will be omitted hereafter.

The position information acquirer 2, the rest information acquirer 3, the stop-off facility determinator 5, the voice acquirer 6, the facility keyword extractor 7, the evaluation keyword extractor 8, the evaluation information generator 9D, the posting processor 10, and the insufficient information notification inputter 17 are implemented as concrete units in each which hardware and software operate in cooperation with each other, respectively, by causing a microcomputer of an information processing device in which the evaluation information posting device 1G is configured to execute a program about the processes specific to the present invention.

By using information about insufficiency which is accepted by the insufficient information notification inputter 17 in addition to stop-off facility information about the facility determined by the stop-off facility determinator 5 and an evaluation keyword extracted by the evaluation keyword extractor 8, the evaluation information generator 9D generates evaluation information about this facility.

When determining that information required to generate evaluation information is insufficient, the evaluation information generator 9D notifies, as insufficient information, the evaluation keyword and the stop-off facility information which are acquired at the current time to the insufficient information notification inputter 17.

For example, when the genre of the stop-off facility is an ice cream shop, even if only an evaluation keyword "sweet" is acquired, it is natural that ice creams are sweet, and there is a high possibility that such an evaluation keyword does not serve as an evaluation of the shop. In this case, the evaluation information generator 9D determines that information required to generate evaluation information is insufficient, and notifies the insufficient information notification inputter 17 to this effect to make a request for information about the insufficiency.

The insufficient information notification inputter 17 notifies the user that information is insufficient for the generation of evaluation information, and accepts an input of information about the insufficiency which is a response to this notification. For example, the insufficient information notification inputter displays information showing that information is insufficient for the generation of evaluation information on a monitor display which is an outputter not shown in FIG. 18, or provides voice guidance showing that information is insufficient for the generation of evaluation information via an in-vehicle speaker.

Further, the insufficient information notification inputter 17 accepts an input of information about the insufficiency which is a response to this notification by using an inputter (a touch panel, hard keys, a voice recognition, or the like) which is not shown in FIG. 18.

More specifically, the insufficient information notification inputter 17 provides an HMI (Human Machine Interface) for notifying insufficiency of information and accepts an input of information about the insufficiency.

Figure 19:
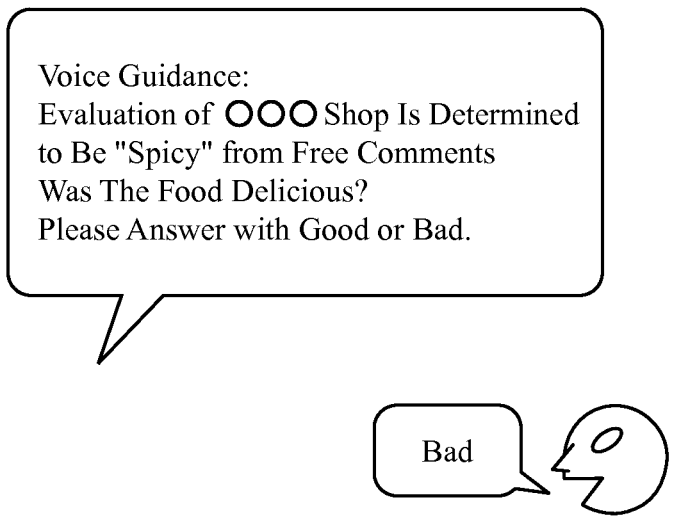
FIG. 19 is a diagram showing an example of voice guidance for making a request for insufficient information in Embodiment 8.

FIG. 19 is a diagram showing an example of the voice guidance with which to make a request for information about the insufficiency in Embodiment 8. First, when a notification showing that information is insufficient is received from the evaluation information generator 9D, the insufficient information notification inputter 17 notifies the user that information required to generate evaluation information is insufficient by using the above-mentioned outputter.

For example, as a state in which an evaluation at the current time is provided from the insufficient information, and a description for requesting the user to make a final evaluation, voice guidance of "It is determined that the evaluation of OOO shop is "spicy" from a free comment. Was the food delicious? Please answer with Good or Bad." is provided, as shown in FIG. 19. The user inputs information about the insufficiency according to this voice guidance. The inputted information is sent to the evaluation information generator 9D as new input information.

As a result, by using the information about the insufficiency which is accepted by the insufficient information notification inputter 17 in addition to the stop-off facility information and the evaluation keyword, the evaluation information generator 9D generates evaluation information about this facility.

As shown in FIG. 19, the user is enabled to utter "Bad" as a response to the notification from the insufficient information notification inputter 17, and the evaluation information generator can acquire information about the insufficiency through a voice recognition.

More specifically, "Bad" which the user has uttered is acquired by the voice acquirer 6, and the evaluation keyword extractor 8 extracts this word as an evaluation keyword and inputs this keyword to the evaluation information generator 9D.

As mentioned above, the evaluation information posting device in accordance with this Embodiment 8 includes the insufficient information notification inputter 17 to notify that information is insufficient for the generation of evaluation information, and accept an input of information about the insufficiency which is a response to this notification, and, by using the information about the insufficiency which is accepted by the insufficient information notification inputter 17, the evaluation information generator 9D generates evaluation information about the facility at which the vehicle has stopped off.

When information is insufficient for the automatic generation of evaluation information, as mentioned above, complete evaluation information can be generated by urging the user to input information and complementing the insufficient information.

In accordance with Embodiment 8, while the load required to cause the user to input information is increased as compared with the other embodiments, by providing the user with an opportunity to make a final evaluation, the number of times that the user posts evaluation information can be expected to be ensured as compared with the case in which the present invention is not used.

Embodiment 9

Figure 20:
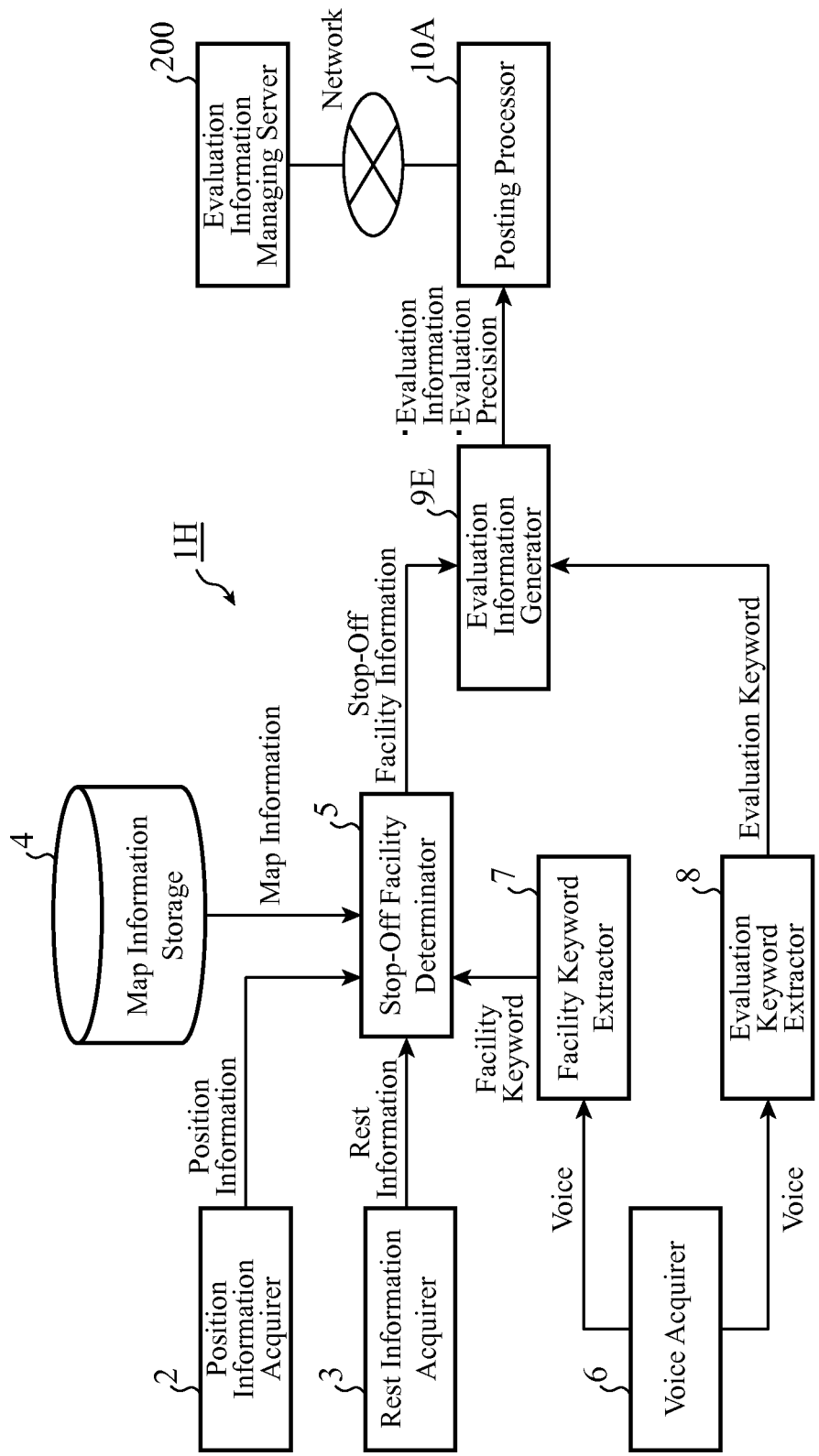
FIG. 20 is a block diagram showing the configuration of an evaluation information posting device in accordance with Embodiment 9 of the present invention.

FIG. 20 is a block diagram showing the configuration of an evaluation information posting device in accordance with Embodiment 9 of the present invention. Referring to FIG. 18, the evaluation information posting device 1H is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5, a voice acquirer 6, a facility keyword extractor 7, an evaluation keyword extractor 8, an evaluation information generator 9E, and a posting processor 10A. In FIG. 20, the same components as those shown in FIG. 1 are denoted by the same reference numerals, and the explanation of the components will be omitted hereafter.

The position information acquirer 2, the rest information acquirer 3, the stop-off facility determinator 5, the voice acquirer 6, the facility keyword extractor 7, the evaluation keyword extractor 8, the evaluation information generator 9E, and the posting processor 10A are implemented as concrete units in each which hardware and software operate in cooperation with each other, respectively, by causing a microcomputer of an information processing device in which the evaluation information posting device 1H is configured to execute a program about the processes specific to the present invention.

The evaluation information generator 9E generates evaluation information, and also determines the precision of the evaluation shown by this evaluation information. For example, the evaluation information generator 9E calculates the precision on the basis of a score showing the consistency of an evaluation keyword, and a score provided in stop-off facility determination (the stop-off facility determination method (5) shown in Embodiment 1).

A score showing the consistency of each evaluation keyword for each facility genre is registered, as an association table showing an association between each facility genre, and evaluation keywords and scores showing their degrees of consistency, in a memory, from which the evaluation information generator 9E can read information, in advance, as shown in FIG. 21.

Further, the scores showing the degrees of consistency of the evaluation keywords are acquired by evaluating the degrees of consistency of evaluation keywords for facilities for each facility genre.

The precision of evaluation information is calculated by multiplying the score provided in the stop-off facility determination by the score showing the consistency with each evaluation keyword.

For example, when the stop-off facility is a ramen shop and the score provided in the stop-off facility determination is "5", the precision of the evaluation information including the evaluation keyword "hot" about this facility has a value of "25" which is acquired by multiplying the score of "5" provided in the stop-off facility determination by the score of "5" showing the consistency of the evaluation keyword "hot".

The evaluation information generator 9E outputs the evaluation information and the precision of this evaluation to the posting processor 10A.

The posting processor 10A posts only evaluation information whose precision, which is determined by the evaluation information generator 9E, is equal to or greater than a threshold to the evaluation information managing server 200. In this case, the threshold to be compared with the precision is equivalent to a lower limit on the precision which is permissible as the quality of evaluation information, and a predetermined value can be set, as the threshold, to the device, or the user is enabled to set the threshold as needed.

As mentioned above, in accordance with this Embodiment 9, the evaluation information generator 9E generates evaluation information, and also determines the precision of the evaluation shown by this evaluation information, and the posting processor 10A posts only evaluation information whose precision, which is determined by the evaluation information generator 9E, is equal to or greater than the threshold. By configuring the evaluation information posting device in this way, the evaluation information posting device can improve the quality of evaluation information.

Embodiment 10

Figure 22:
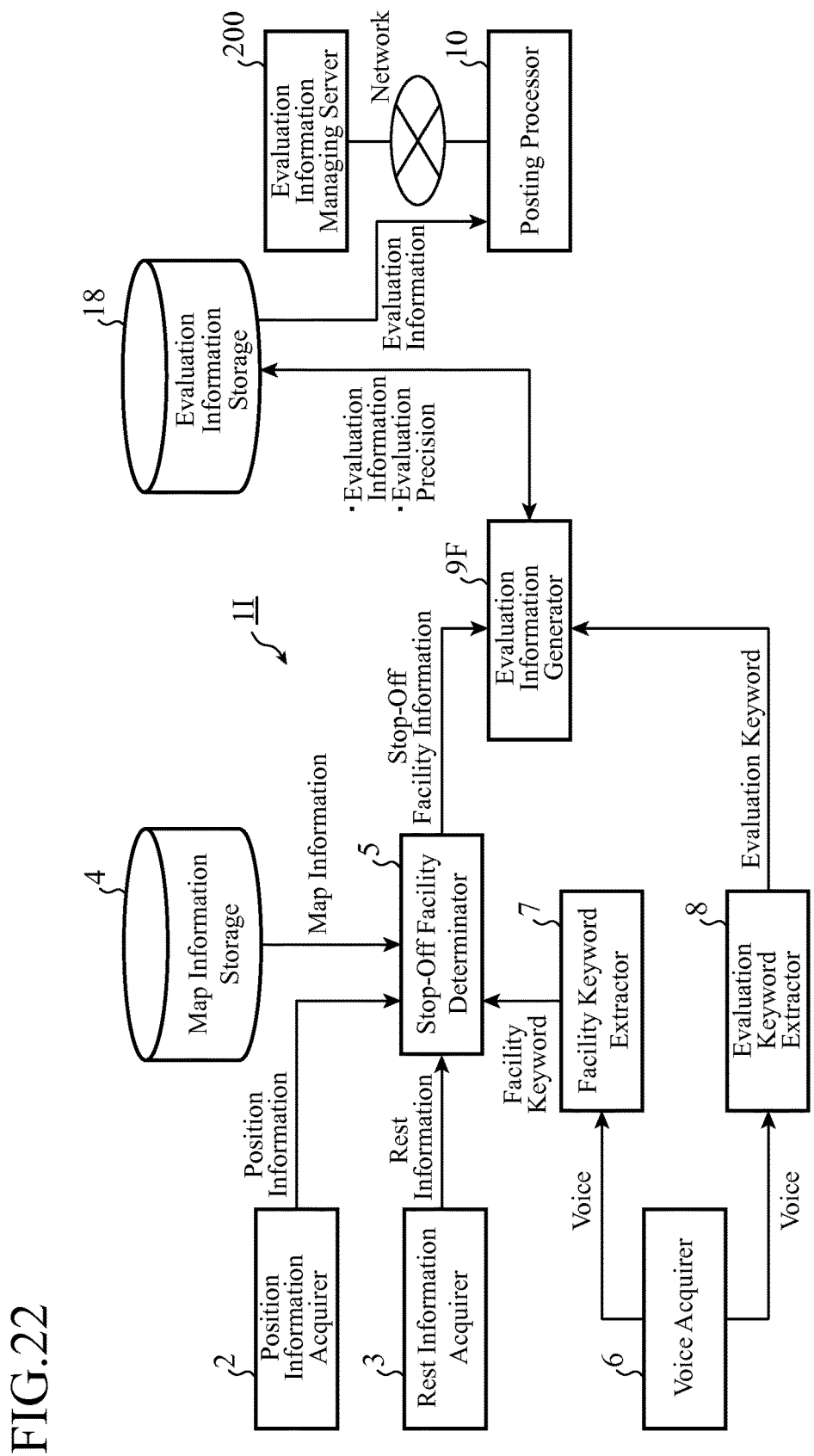
FIG. 22 is a block diagram showing the configuration of an evaluation information posting device in accordance with Embodiment 10 of the present invention.

FIG. 22 is a block diagram showing the configuration of an evaluation information posting device in accordance with Embodiment 10 of the present invention. Referring to FIG. 22, the evaluation information posting device 1I is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5, a voice acquirer 6, a facility keyword extractor 7, an evaluation keyword extractor 8, an evaluation information generator 9F, a posting processor 10B, and an evaluation information storage 18. In FIG. 22, the same components as those shown in FIGS. 1 and 20 are denoted by the same reference numerals, and the explanation of the components will be omitted hereafter.

The position information acquirer 2, the rest information acquirer 3, the stop-off facility determinator 5, the voice acquirer 6, the facility keyword extractor 7, the evaluation keyword extractor 8, the evaluation information generator 9F, and the posting processor 10B are implemented as concrete units in each which hardware and software operate in cooperation with each other, respectively, by causing a microcomputer of an information processing device in which the evaluation information posting device 1I is configured to execute a program about the processes specific to the present invention.

The evaluation information generator 9F updates both evaluation information read from the evaluation information storage 18, and the precision of the evaluation information by using stop-off facility information about a facility determined by the stop-off facility determinator 5 and an evaluation keyword extracted by the evaluation keyword extractor 8.

For example, every time when newly acquiring stop-off facility information from the stop-off facility determinator 5, the evaluation information generator 9F retrieves the evaluation information corresponding to the facility shown by this facility information from the evaluation information storage 18, and updates the evaluation information which is a retrieval result by using both the stop-off facility information, which is newly acquired, and the evaluation keyword. At that time, the evaluation information generator 9F also updates the precision of the evaluation information, and stores this precision in the evaluation information storage 18 again.

The posting processor 10B posts only evaluation information whose precision is equal to or greater than a threshold, among the pieces of evaluation information stored in the evaluation information storage 18.

The evaluation information storage 18 stores evaluation information and the precision of an evaluation shown by this evaluation information. For example, the evaluation information storage 18 is configured in either a storage, such as a hard disk drive unit (HDD) mounted in the vehicle-mounted device, or a storage disposed in an external device, such as a server or a smart phone, connected to a network.

By doing in this way, even if the precision of an evaluation is low because evaluation keywords are hardly uttered at the time of generating evaluation information, if an evaluation keyword is uttered when the vehicle has stopped off at the same facility again, the evaluation information posting device can update the evaluation information and the precision of the evaluation information.

As a result, because when the precision of an evaluation is improved, the evaluation information posting device posts evaluation information, the evaluation information posting device can provide an improvement in the quality of the evaluation information.

Figure 23:
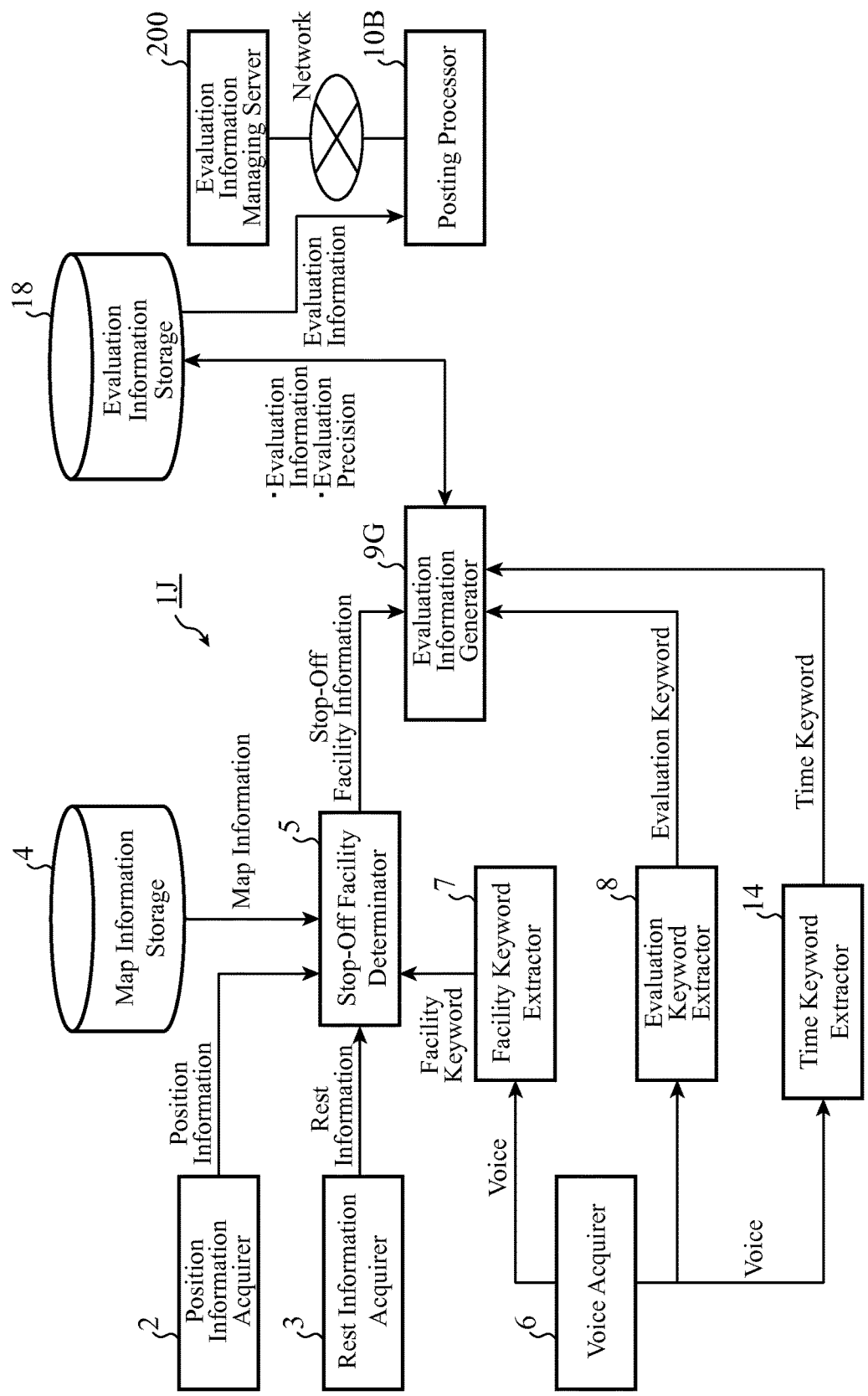
FIG. 23 is a block diagram showing another configuration of the evaluation information posting device in accordance with Embodiment 10.

FIG. 23 is a block diagram showing another configuration of the evaluation information posting device in accordance with Embodiment 10. The evaluation information posting device 1J additionally includes a time keyword extractor 14 in addition to the configuration shown in FIG. 22. The evaluation information generator 9G reads the evaluation information at the time determined by a keyword extracted by the time keyword extractor 14 from the evaluation information storage 18, and updates this evaluation information and the precision of the evaluation information. In FIG. 23, the same components as those shown in FIG. 22 are denoted by the same reference numerals, and the explanation of the components will be omitted hereafter.

For example, when the user utters "The ramen shop to which I went yesterday for lunch was spicy and delicious.", "yesterday for lunch" is extracted as a time keyword, the evaluation information about the facility corresponding to this time is read from the evaluation information storage 18, "spicy" and "delicious" are further extracted as evaluation keywords, and the evaluation information is updated by using these evaluation keywords and the stop-off facility information. At that time, the precision of the evaluation is also updated. Even by doing in this way, because when the precision of an evaluation is improved, the evaluation information posting device posts evaluation information, the evaluation information posting device can provide an improvement in the quality of the evaluation information.

As mentioned above, the evaluation information posting device in accordance with this Embodiment 10 includes the evaluation information storage 18 to store evaluation information and the precision of the evaluation information, and the evaluation information generator 9F updates the evaluation information read from the evaluation information storage 18 and the precision of the evaluation information by using stop-off facility information about a facility at which the vehicle has stopped off, and an evaluation keyword which is extracted for this facility by the evaluation keyword extractor 8, and the posting processor 10B posts only evaluation information whose precision is equal to or greater than the threshold, among the pieces of evaluation information stored in the evaluation information storage 18. By configuring the evaluation information posting device in this way, even though the precision of evaluation information is low because there is little utterance of an evaluation keyword, the evaluation information posting device can update the evaluation information and the precision of the evaluation information by using an utterance of an evaluation keyword by the user after that. As a result, because when the precision of an evaluation is improved, the evaluation information posting device posts evaluation information, the evaluation information posting device can provide an improvement in the quality of the evaluation information.

Further, the evaluation information posting device in accordance with this Embodiment 10 includes the time keyword extractor 14 to extract a keyword about a time from an uttered voice acquired by the voice acquirer 6, and the evaluation information generator 9G reads the evaluation information at the time specified by the keyword extracted by the time keyword extractor 14 from the evaluation information storage 18, and updates this evaluation information and the precision of the evaluation information. Even by doing in this way, because when the precision of an evaluation is improved, the evaluation information posting device posts evaluation information, the evaluation information posting device can provide an improvement in the quality of the evaluation information.

Embodiment 11

Figure 24:
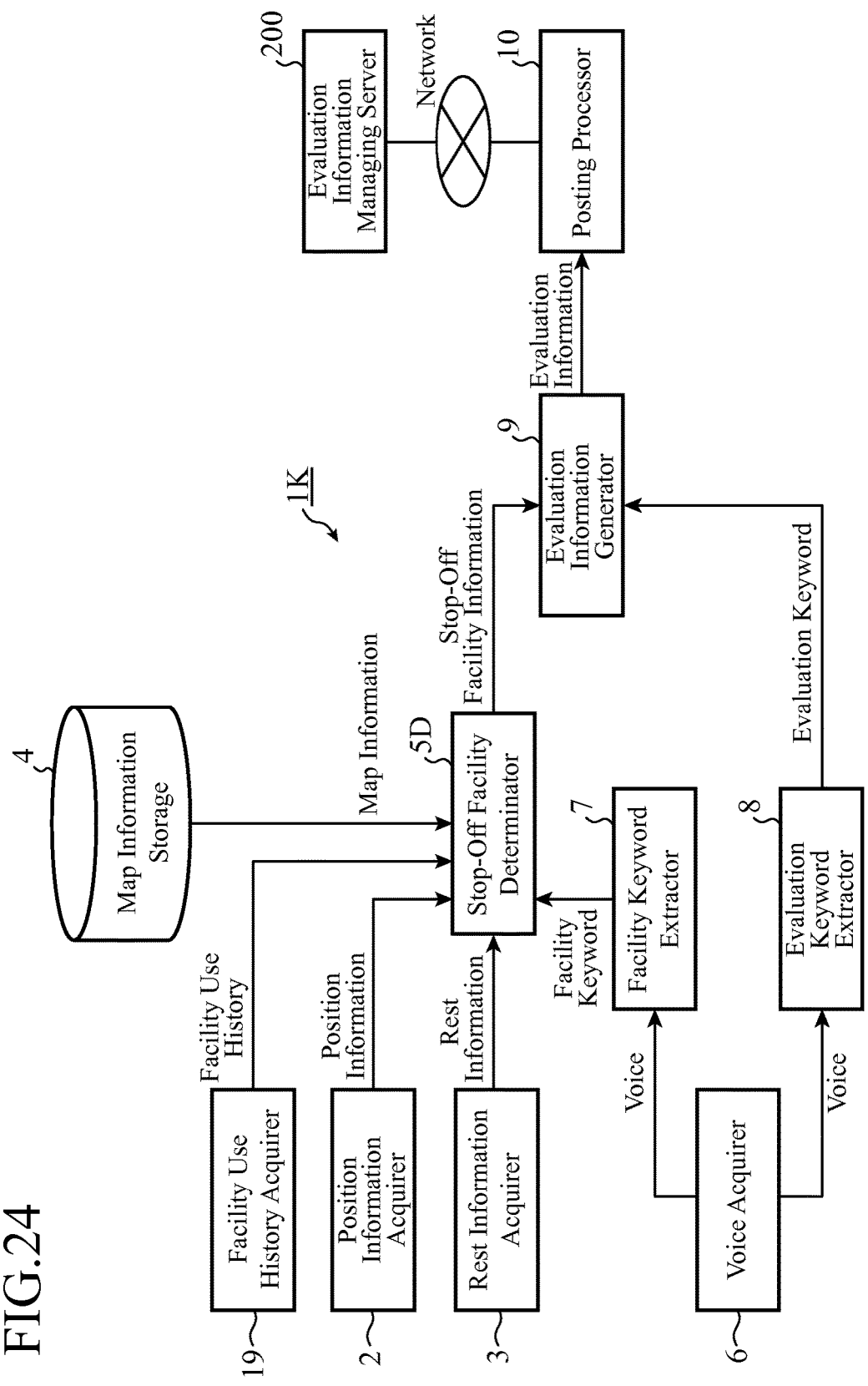
FIG. 24 is a block diagram showing the configuration of an evaluation information posting device in accordance with Embodiment 11 of the present invention.

FIG. 24 is a block diagram showing the configuration of an evaluation information posting device in accordance with Embodiment 11 of the present invention. Referring to FIG. 24, the evaluation information posting device 1K is a vehicle-mounted device mounted in a moving object (for example, a vehicle), like that in accordance with Embodiment 1, and is configured to include a position information acquirer 2, a rest information acquirer 3, a map information storage 4, a stop-off facility determinator 5D, a voice acquirer 6, a facility keyword extractor 7, an evaluation keyword extractor 8, an evaluation information generator 9, a posting processor 10, and a facility use history acquirer 19. In FIG. 24, the same components as those shown in FIG. 1 are denoted by the same reference numerals, and the explanation of the components will be omitted hereafter.

The stop-off facility determinator 5D determines a facility at which the vehicle has stopped off by using use history information about a facility which is acquired by the facility use history acquirer 19 in addition to position information acquired by the position information acquirer 2, map information read from the map information storage 4 and including facility information about facilities located in an area surrounding the position shown by the above-mentioned position information, rest information showing that the vehicle has been at rest, and a facility keyword.

The facility use history acquirer 19 has a function of acquiring use history information about a stop-off facility which the user has used. For example, the facility use history acquirer is connected to a mobile terminal, such as a mobile phone or a smart phone, and acquires a history of uses of a payment machine disposed in a stop-off facility and using a near field communication (NFC), or the like, as use history information about this facility.

The position information acquirer 2, the rest information acquirer 3, the stop-off facility determinator 5D, the voice acquirer 6, the facility keyword extractor 7, the evaluation keyword extractor 8, the evaluation information generator 9, the posting processor 10, and the facility use history acquirer 19 are implemented as concrete units in each which hardware and software operate in cooperation with each other, respectively, by causing a microcomputer of an information processing device in which the evaluation information posting device 1K is configured to execute a program about the processes specific to the present invention.

Next, operations will be explained.

Figure 25:
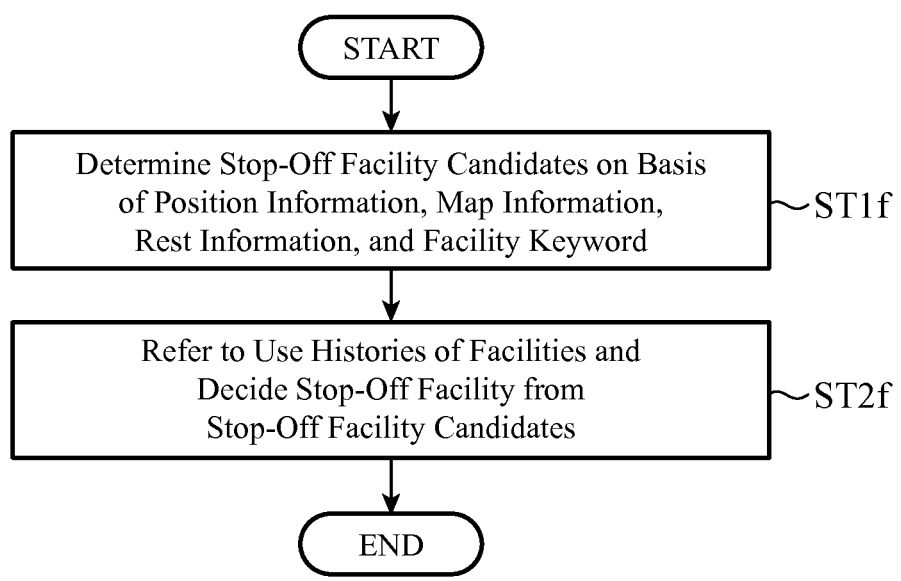
FIG. 25 is a flow chart showing an example of a stop-off facility determining process in Embodiment 11.

FIG. 25 is a flow chart showing an example of a stop-off facility determining process in Embodiment 11. First, the stop-off facility determinator 5D determines stop-off facility candidates which can be estimated to have been stopped off at by the user with the vehicle by using the position information of the vehicle, the map information including the facility information about facilities located in an area surrounding the position shown by this position information, the rest information, and the facility keyword (step ST1f), like that in accordance with Embodiment 1. Next, the stop-off facility determinator 5D decides a stop-off facility by referring to the use history information acquired by the facility use history acquirer 19, and selecting the facility candidate corresponding to the facility shown by the use history information from the stop-off facility candidates determined in step ST1f (step ST2f).

As mentioned above, the evaluation information posting device in accordance with this Embodiment 11 includes the facility use history acquirer 19 to acquire use history information about a used stop-off facility, and the stop-off facility determinator 5D determines a facility at which the vehicle has stopped off by using the use history information about the facility which is acquired by the facility use history acquirer 19.

By using the use history about an NFC payment machine disposed in a stop-off facility for the stop-off facility determination in this way, the evaluation information posting device can perform the stop-off facility determination with a higher degree of precision.

Embodiment 12

Figure 26:
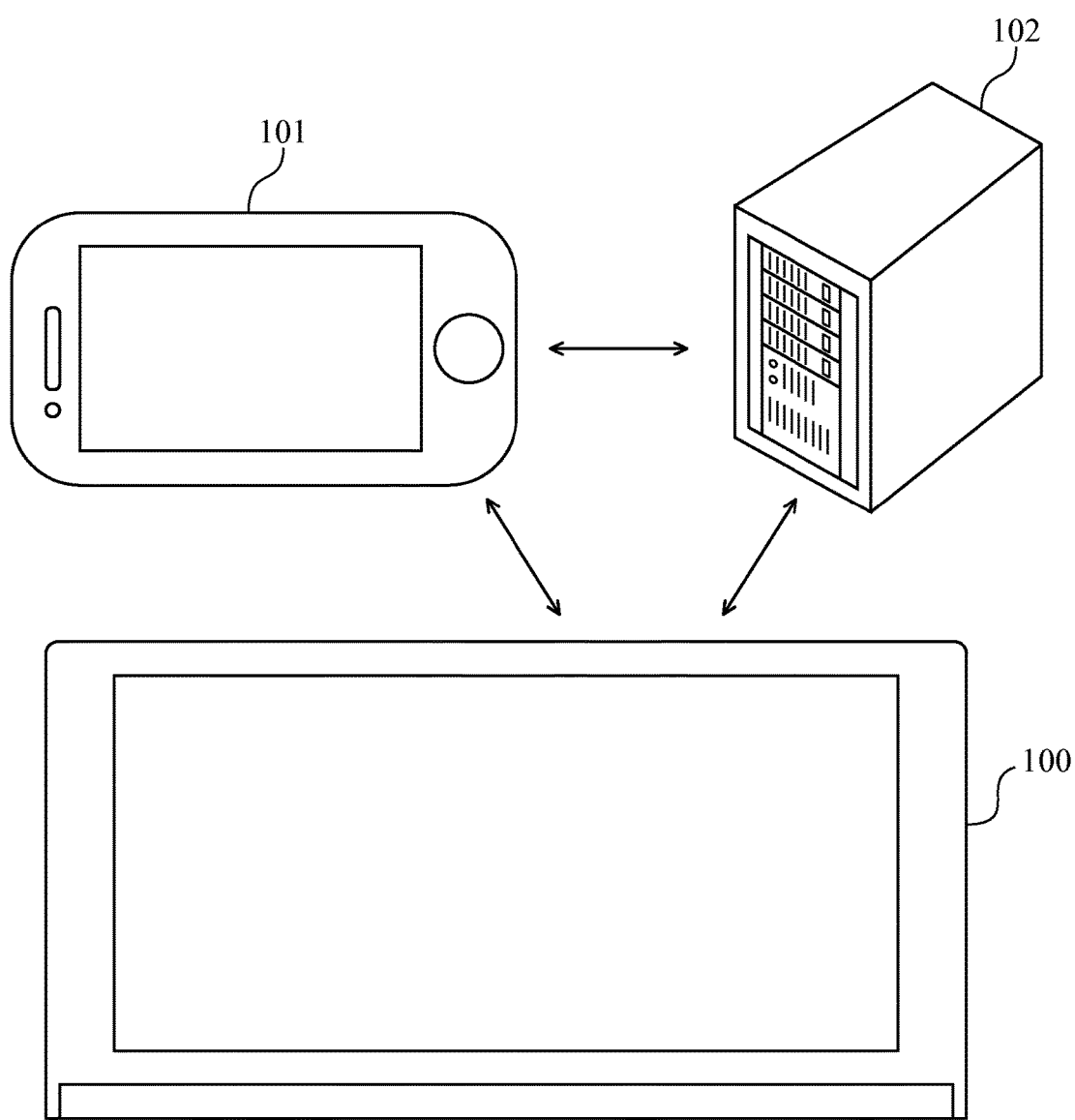
FIG. 26 is a diagram showing an evaluation information posting system in accordance with Embodiment 12 of the present invention.

FIG. 26 is a diagram showing an evaluation information posting system in accordance with Embodiment 12 of the present invention. In the evaluation information posting system shown in FIG. 26, the vehicle-mounted device 100 performs a process of generating and posting evaluation information in cooperation with at least one of a mobile terminal 101, such as a smart phone, and a server device 102. Hereafter, an embodiment of the configuration of this evaluation information posting system will be explained.

First, a case in which the vehicle-mounted device 100 functions as an evaluation information posting device in cooperation with the server device 102 will be explained.

In this configuration, the vehicle-mounted device 100 directly communicates with the server device 102, or communicates with the server device 102 via the mobile terminal 101.

The server device 102 includes a rest information acquirer 3, a map information storage 4, a stop-off facility determinator 5, a facility keyword extractor 7, an evaluation keyword extractor 8, an evaluation information generator 9, and a posting processor 10 which are shown in FIG. 1. Further, the vehicle-mounted device 100 is mounted in a vehicle, and serves as a terminal device provided with at least a position information acquirer 2 to acquire position information about the vehicle, and a voice acquirer 6 to acquire a user's uttered voice.

By configuring the evaluation information posting system in this way, the server device 102 communicates with the vehicle-mounted device 100 to receive the position information and an uttered voice, generates evaluation information about a facility at which the vehicle has stopped off by using the position information and the uttered voice, and posts the evaluation information to the evaluation information managing server 200 (not shown in FIG. 26).

Next, an explanation will be made as to the configuration in which the mobile terminal 101 performs a process of generating and posting evaluation information in cooperation with the server device 102.

In this configuration, the mobile terminal 101 is configured to include a position information acquirer 2, a rest information acquirer 3, a stop-off facility determinator 5, a voice acquirer 6, a facility keyword extractor 7, an evaluation keyword extractor 8, an evaluation information generator 9, and a posting processor 10. Further, the server device 102 includes a map information storage 4.

The mobile terminal 101 is carried by a passenger of the vehicle, transmits the position information about the vehicle which is acquired by the position information acquirer 2 to the server device 102, and receives map information including facility information about facilities located in an area surrounding the position shown by this position information.

The mobile terminal 101 then determines a facility at which the vehicle has stopped off by using the above-mentioned position information about the vehicle, the above-mentioned map information received from the server device 102, rest information acquired by the rest information acquirer 3, and a facility keyword extracted from an uttered voice which is acquired by the voice acquirer 6, generates evaluation information about the facility which is a result of the determination by using the information about this facility and an evaluation keyword extracted from the uttered voice, and posts the evaluation information to the evaluation information managing server 200.

As mentioned above, the server device 102 in accordance with this Embodiment 12 includes: the facility keyword extractor 7 to extract a facility keyword from an uttered voice acquired by the voice acquirer 6; the evaluation keyword extractor 8 to extract an evaluation keyword from the uttered voice acquired by the voice acquirer 6; the rest information acquirer 3 to acquire rest information showing that the vehicle has been at rest; the stop-off facility determinator 5 to determine a rest state of the vehicle on the basis of the rest information acquired by the rest information acquirer 3, and determine a facility at which the vehicle has stopped off by using position information about the rest position of the vehicle, which is acquired by the position information acquirer 2, map information including facility information about facilities located in an area surrounding the position shown by this position information, and a keyword about a facility at the rest position of the vehicle, which is extracted by the facility keyword extractor 7; the evaluation information generator 9 to, by using stop-off facility information about the facility determined by the stop-off facility determinator 5, and a keyword about an evaluation which is extracted for this facility by the evaluation keyword extractor 8, generate evaluation information about this facility; and the posting processor 10 to post the evaluation information generated by the evaluation information generator 9 to the evaluation information managing server 200.

By configuring the server device in this way, the server device can automatically generate evaluation information about a facility at which the user has stopped off by using both the rest information of the vehicle and an uttered voice, and post the evaluation information to the evaluation information managing server 200, thereby being able to reduce the load on the user of generating and posting evaluation information, and also establish increase in the number of posts.

Further, in the mobile terminal 101, such as a smart phone, in accordance with this Embodiment 12, the step of the position information acquirer 2 acquiring position information about the vehicle, the step of the voice acquirer 6 acquiring an uttered voice, the step of the facility keyword extractor 7 extracting a facility keyword from the uttered voice acquired by the voice acquirer 6, the step of the evaluation keyword extractor 8 extracting an evaluation keyword from the uttered voice acquired by the voice acquirer 6, the step of the rest information acquirer 3 acquiring rest information showing that the vehicle has been at rest, the step of the stop-off facility determinator 5 determining the rest state of the vehicle on the basis of the rest information acquired by the rest information acquirer 3, and determining a facility at which the vehicle has stopped off by using position information about the rest position of the vehicle, which is acquired by the position information acquirer 2, map information including facility information about facilities located in an area surrounding the position shown by this position information, and a keyword about a facility at the rest position of the vehicle, which is extracted by the facility keyword extractor 7, the step of the evaluation information generator 9 generating evaluation information about this facility by using stop-off facility information about the facility determined by the stop-off facility determinator 5, and a keyword about an evaluation which is extracted for this facility by the evaluation keyword extractor 8, and the step of the posting processor 10 posting the evaluation information generated by the evaluation information generator 9 to the evaluation information managing server 200 are performed.

Also by doing in this way, the load on the user of generating and posting evaluation information can be reduced, and increase in the number of posts can also be established.

Further, because a GPS receiving unit which serves as the position information acquirer 2, the voice acquirer 6, such as a microphone, and so on are standardly disposed in the mobile terminal 101 such as a smart phone, dedicated devices which should be added for the present invention can be reduced, and introduction of the present invention can be implemented at a low cost.

Further, all or at least two of the configurations shown in Embodiments 1 to 3, 5, and 12 can be disposed so as to perform the stop-off facility determination.

More specifically, the stop-off facility determinator can determine a stop-off facility by using all or at least two of the evaluation keyword extracted by the evaluation keyword extractor 8, the point information set by the specific point setter 11, the traveling route information read from the traveling route storage 13, and the use history information about a facility which is acquired by the facility use history acquirer 19, in addition to the position information, the map information including the position shown by this position information, the rest information, and the facility keyword.

In this case, priorities for determination are assigned to the evaluation keyword, the point information, the traveling route information, and the use history information about a facility, respectively. Although the priorities can be set by the user as needed, the priorities can be set in advance according to the precision of the determination.

In addition, all or at least two of the configurations shown in Embodiments 4 and 6 to 8 can be disposed so as to generate evaluation information about a facility.

More specifically, by using all or at least two of the stop-off facility information about the facility determined by the stop-off facility determinator, the keyword extracted by the valid evaluation keyword extractor 12, the stop-off facility information about the facility at which the vehicle stopped off at the time determined by the keyword extracted by the time keyword extractor 14, the biological information acquired by the biological information acquirer 16, the information about the insufficiency which is accepted by the insufficient information notification inputter 17, the evaluation information generator can generate evaluation information about the facility.

Although the case in which the moving object is a vehicle is shown in above-mentioned Embodiments 1 to 12, the moving object can be a one including a person, a railroad, a ship, or an airplane.

While the present invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the evaluation information posting device in accordance with the present invention can reduce the load on the user of generating evaluation information about a stop-off facility, and posting the evaluation information to an evaluation information managing server, the evaluation information posting device is suitable for, for example, a navigation device mounted in and used for a vehicle which can stop off at various facilities.

EXPLANATIONS OF REFERENCE NUMERALS

1, and 1A to 1K evaluation information posting device, 2 position information acquirer, 3 rest information acquirer, 4 map information storage, 5, and 5A to 5D stop-off facility determinator, 6 voice acquirer, 7 facility keyword extractor, 8 evaluation keyword extractor, 9, and 9A to 9G evaluation information generator, 10, 10A, and 10B posting processor, 11 specific point setter, 12 valid evaluation keyword extractor, 13 traveling route storage, 14 time keyword extractor, 15 stop-off facility storage, 16 biological information acquirer, 17 insufficient information notification inputter, 18 evaluation information storage, 19 facility use history acquirer, 100 vehicle-mounted device, 101 mobile terminal, 102 server device, and 200 evaluation information managing server.

The invention claimed is:

1. An evaluation information posting device that is mounted or carried by a moving object, and that generates evaluation information about a facility at which said moving object has stopped off, and posts the evaluation information to an evaluation information managing server, said evaluation information posting device comprising:
a GPS (Global Positioning System) receiver or gyro;
a microphone;
a processor; and
a memory storing instructions which, when executed by the processor, performs a process including,
acquiring position information about said moving object via the GPS receiver or gyro;
acquiring an uttered voice via the microphone;
extracting a keyword about a facility from the acquired uttered voice;
extracting a keyword about an evaluation from the acquired uttered voice;
acquiring rest information showing that said moving object has been at rest;
determining a rest state of said moving object on a basis of the acquired rest information,
determining a facility at which said moving object has stopped off by using acquired position information about the rest position of said moving object, map information including facility information about facilities located in an area surrounding the position shown by this position information, and an extracted keyword about a facility at the rest position of said moving object;
using both facility information about the determined facility,and a keyword about an evaluation which is extracted for this facility, to generate evaluation information about this facility; and
posting the generated evaluation information to said evaluation information managing server,
wherein said evaluation infounation posting device further includes a storage device that stores pieces of facility information about facilities at which said moving object stopped off, and
wherein the process further includes extracting a time-related keyword from the acquired uttered voice, determining a time associated with the time-related keyword, reading facility information about a facility at which said moving object stopped off at the determined time from the storage device, and using the read facility information and a keyword about an evaluation which is extracted for this facility, to generate evaluation information about this facility.

2. The evaluation information posting device according to claim 1, wherein the process determines the facility at which said moving object has stopped off by using the extracted keyword about an evaluation of a facility.

3. The evaluation information posting device according to claim 1, wherein the process further includes accepting a setting of point information about a point at which said moving object will stop off, and wherein the process determines the facility at which said moving object has stopped off by using the accepted point information.

4. The evaluation information posting device according to claim 1, wherein the process further includes extracting a keyword about an evaluation of the determined facility from among extracted keywords about evaluations, and wherein by using the facility information about the facility at which said moving object has stopped off, and the extracted keyword extracted from among the extracted keywords about evaluations, the process generates the evaluation information about this facility.

5. The evaluation information posting device according to claim 1, wherein said evaluation information posting device includes a storage device that stores route information about a route along which said moving object is moving, and wherein the process determines the facility at which said moving object has stopped off by using the route information read from the storage device.

6. The evaluation information posting device according to claim 1, wherein the process further includes acquiring a user's biological information, and wherein the process generates the evaluation information about the facility at which said moving object has stopped off by using the acquired biological information.

7. The evaluation information posting device according to claim 1, wherein the process further includes making a notification that information is insufficient for the generation of said evaluation information, and accepting an input of information about insufficiency which is a response to this notification, and wherein the process generates the evaluation information about the facility at which said moving object has stopped off by using the accepted information about the insufficiency.

8. The evaluation information posting device according to claim 1, wherein the process generates the evaluation information, and also determines precision of an evaluation shown by this evaluation information, and posts only evaluation information whose determined precision is equal to or greater than a threshold.

9. The evaluation information posting device according to claim 1, wherein the process further includes acquiring use history information about stop-off facilities, and wherein the process determines the facility at which said moving object has stopped off by using the acquired use history information.

10. An evaluation information posting device that is mounted or carried by a moving object, and that generates evaluation information about a facility at which said moving object has stopped off, and posts the evaluation information to an evaluation information managing server, said evaluation information posting device comprising:
   a GPS (Global Positioning System) receiver or gyro;
   a microphone;
   a processor; and
   a memory storing instructions which, when executed by the processor, performs a process including,
      acquiring position information about said moving object via the GPS receiver or gyro;
      acquiring an uttered voice via the microphone;
      extracting a keyword about a facility from the acquired uttered voice;
      extracting a keyword about an evaluation from the acquired uttered voice;
      acquiring rest information showing that said moving object has been at rest;
      determining a rest state of said moving object on a basis of the acquired rest information,
      determining a facility at which said moving object has stopped off by using acquired position information about the rest position of said moving object, map information including facility information about facilities located in an area surrounding the position shown by this position information, and an extracted keyword about a facility at the rest position of said moving object;
      using both facility information about the determined facility, and a keyword about an evaluation which is extracted for this facility, to generate evaluation information about this facility; and
   posting the generated evaluation information to said evaluation information managing server,
   wherein said evaluation information posting device includes a storage device that stores said evaluation information and its precision, and wherein the process updates said evaluation information and its precision which are read from the storage device by using both the facility information about the facility at which said moving object has stopped off, and the keyword about an evaluation which is extracted for this facility, and posts only evaluation information which is included in the evaluation information stored in the storage device and whose said precision is equal to or greater than a threshold.

11. The evaluation information posting device according to claim 10, wherein the process further includes extracting a time-related keyword from the acquired uttered voice, determining a time associated with the time-related keyword, reading evaluation information at the determined time from the storage device, and updating this evaluation information and its precision.

12. An evaluation information posting device that is mounted or carried by a moving object, that communicates with a terminal device having a position information acquirer that acquires position information about said moving object, and a voice acquirer that acquires an uttered voice, to receive said position information and said uttered voice, and that generates evaluation information about a facility at which said moving object has stopped off by using said position information and said uttered voice, and posts the evaluation information to an evaluation information managing server, said evaluation information posting device comprising:
   a processor; and
   a memory storing instructions which, when executed by the processor, performs a process including:
      extracting a keyword about a facility from the uttered voice acquired by said voice acquirer;
      extracting a keyword about an evaluation from the uttered voice acquired by said voice acquirer;
      acquiring rest information showing that said moving object has been at rest;
      determining a rest state of said moving object on a basis of the acquired rest information;
      determining a facility at which said moving object has stopped off by using position information about the acquired rest position of said moving object, which is acquired by said position information acquirer, map information including facility information about facilities located in an area surrounding the position shown by this position information, and an extracted keyword about a facility at the rest position of said moving object,
      using both facility information about the facility, and a keyword about an evaluation which is extracted for this facility, to generate evaluation information about this facility; and
      posting the generated evaluation information to said evaluation information managing server,
   wherein said evaluation information posting device further includes a storage device that stores pieces of facility information about facilities at which said moving object stopped off, and
   wherein the process further includes extracting a time-related keyword from the acquired uttered voice, determining a time associated with the time-related keyword, reading facility information about a facility at which said moving object stopped off at the determined time from the storage device, and using the read facility information and a keyword about an evaluation which is extracted for this facility, to generate evaluation information about this facility.

13. An evaluation information posting method executed by a processor to generate evaluation information about a facility at which a moving object has stopped off, and post the evaluation information to an evaluation information managing server, said evaluation information posting method comprising:
   acquiring position information about said moving object based on information acquired by a GPS (Global Positioning System) receiver or a gyro;
   acquiring an uttered voice via a microphone;
   extracting a keyword about a facility from the acquired uttered voice;
   extracting a keyword about an evaluation from the uttered voice;
   acquiring rest information showing that said moving object has been at rest;

determining a rest state of said moving object on a basis of the acquired rest information acquired;

determining a facility at which said moving object has stopped off by using the acquired position information about the rest position of said moving object, map information including facility information about facilities located in an area surrounding the position shown by this position information, and an extracted keyword about a facility at the rest position of said moving object;

using both facility information about the determined facility, and a keyword about valuation which is extracted for this facility, to generate evaluation information about this facility; and posting the generated evaluation information to said evaluation information managing server, wherein the method further includes:

storing pieces of facility information about facilities at which said moving object stopped off, and extracting a time-related keyword from the acquired uttered voice, determining a time associated with the time-related keyword, reading facility information about a facility at which said moving object stopped off at the determined time through the storing process, and using the read facility information and a keyword about an evaluation which is extracted for this facility, to generate evaluation information about this facility.

* * * * *